(12) United States Patent
Nam et al.

(10) Patent No.: US 10,951,279 B2
(45) Date of Patent: *Mar. 16, 2021

(54) MULTI-INPUT AND MULTI-OUTPUT COMMUNICATION METHOD IN LARGE-SCALE ANTENNA SYSTEM

(71) Applicant: Electronics and Telecommunications Research Institute, Daejeon (KR)

(72) Inventors: Jun Young Nam, Daejeon (KR); Jae Young Ahn, Daejeon (KR)

(73) Assignee: Electronics and Telecommunications Research institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,116

(22) Filed: Jul. 11, 2019

(65) Prior Publication Data

US 2019/0341976 A1   Nov. 7, 2019

Related U.S. Application Data

(62) Division of application No. 15/477,366, filed on Apr. 3, 2017, now Pat. No. 10,608,711, which is a division
(Continued)

(30) Foreign Application Priority Data

Feb. 23, 2012 (KR) .......................... 10-2012-0018420
Jun. 13, 2012 (KR) .......................... 10-2012-0063168
(Continued)

(51) Int. Cl.
*H04B 7/0452* (2017.01)
*H04B 7/0456* (2017.01)
(Continued)

(52) U.S. Cl.
CPC ......... *H04B 7/0452* (2013.01); *H04B 7/0456* (2013.01); *H04B 7/0469* (2013.01);
(Continued)

(58) Field of Classification Search
CPC .......... H04W 72/1226; H04L 25/0224; H04L 1/0026; H04L 5/0048; H04B 7/0452;
(Continued)

(56) References Cited

U.S. PATENT DOCUMENTS

2005/0032521 A1    2/2005  Lee et al.
2006/0285504 A1   12/2006  Dong et al.
(Continued)

FOREIGN PATENT DOCUMENTS

KR    1020080090735 A    10/2008
KR    1020080112070 A    12/2008
(Continued)

*Primary Examiner* — Ricardo H Castaneyra
(74) *Attorney, Agent, or Firm* — William Park & Associates Ltd.

(57) ABSTRACT

The present invention relates to a multi-input and multi-output communication method in a large-scale antenna system. An MIMO transmission method according to the present invention includes: obtaining statistical channel information on at least one terminal, dividing terminals into a plurality of classes and a plurality of groups based on the statistical channel information, wherein the groups depend on the classes; determining a group beam-forming matrix for each of the divided groups; performing a group beamforming transmission by group based on the group beam-forming matrix to obtain instantaneous channel information; and scheduling terminals based on the instantaneous channel information. Thus, it is possible to decrease the complexity in a scheduling and precoding calculation without an
(Continued)

increase in the amount of wireless resources that are required for providing feedback for a reference signal and channel status information.

3 Claims, 4 Drawing Sheets

Related U.S. Application Data of application No. 14/379,371, filed as application No. PCT/KR2013/001475 on Feb. 25, 2013, now Pat. No. 9,813,123.

(30) Foreign Application Priority Data

| | | |
|---|---|---|
| Nov. 13, 2012 | (KR) | 10-2012-0128338 |
| Jan. 4, 2013 | (KR) | 10-2013-0001097 |
| Feb. 22, 2013 | (KR) | 10-2013-0019075 |

(51) Int. Cl.
  *H04B 7/06* (2006.01)
  *H04W 72/12* (2009.01)
  *H04L 5/00* (2006.01)

(52) U.S. Cl.
  CPC ......... *H04B 7/0478* (2013.01); *H04B 7/0482* (2013.01); *H04B 7/0617* (2013.01); *H04B 7/0619* (2013.01); *H04B 7/0634* (2013.01); *H04B 7/0639* (2013.01); *H04L 5/0048* (2013.01); *H04W 72/1226* (2013.01)

(58) Field of Classification Search
  CPC .... H04B 7/0482; H04B 7/043; H04B 7/0421; H04B 7/0469; H04B 7/0413; H04B 7/0619; H04B 7/0634; H04B 7/0478; H04B 7/0639; H04B 7/0456; H04B 7/0617; H04B 7/0626
  See application file for complete search history.

(56) References Cited

U.S. PATENT DOCUMENTS

| | | |
|---|---|---|
| 2008/0101498 A1 | 5/2008 | Han et al. |
| 2008/0247330 A1 | 10/2008 | Ko et al. |
| 2009/0041150 A1 | 2/2009 | Tsai et al. |
| 2009/0069054 A1 | 3/2009 | Zangi et al. |
| 2009/0080504 A1 | 3/2009 | Li et al. |
| 2009/0274227 A1 | 11/2009 | Kim et al. |
| 2010/0172430 A1 | 7/2010 | Melzer et al. |
| 2010/0195527 A1 | 8/2010 | Gorokhov et al. |
| 2010/0238851 A1 | 9/2010 | Sundaresan et al. |
| 2010/0303170 A1 | 12/2010 | Zhu et al. |
| 2010/0304776 A1 | 12/2010 | Wu et al. |
| 2011/0150052 A1 | 6/2011 | Erell et al. |
| 2011/0164668 A1 | 7/2011 | Hoek et al. |
| 2011/0188599 A1 | 8/2011 | Kang et al. |
| 2013/0229941 A1 | 9/2013 | Huang et al. |
| 2013/0336224 A1 | 12/2013 | Davydov et al. |

FOREIGN PATENT DOCUMENTS

| | | |
|---|---|---|
| KR | 1020100120291 A | 11/2010 |
| KR | 1020110020352 A | 3/2011 |
| KR | 1020110050570 A | 5/2011 |
| WO | 2006102639 A1 | 9/2006 |

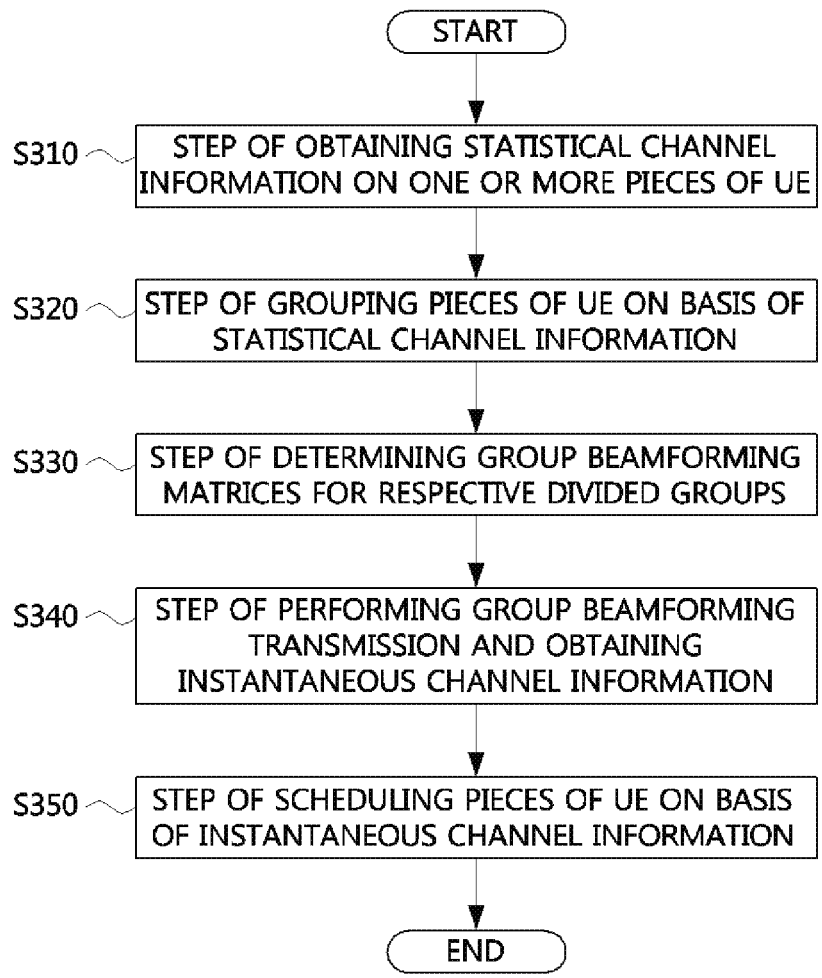
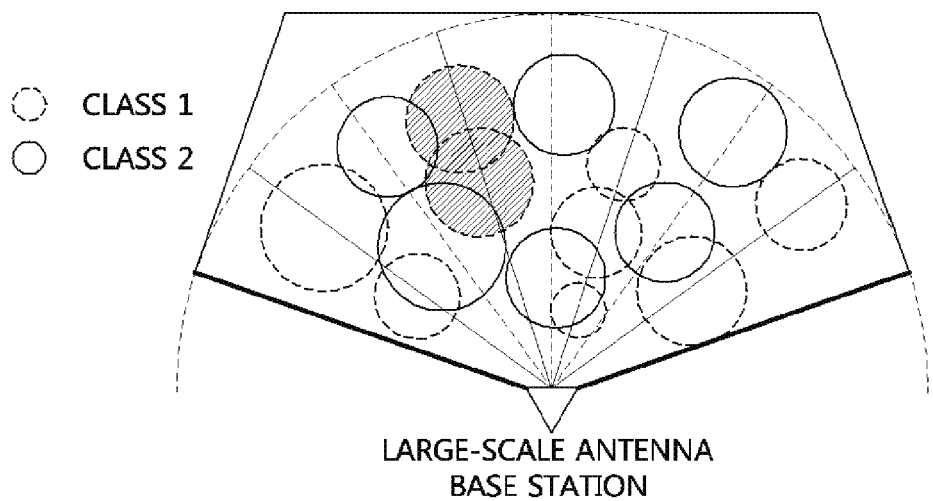

MULTI-INPUT AND MULTI-OUTPUT COMMUNICATION METHOD IN LARGE-SCALE ANTENNA SYSTEM

TECHNICAL FIELD

The present invention relates to a multi-input multi-output (MIMO) communication method in a large-scale antenna system, and more particularly, to an MIMO communication method that maximizes up•downlink frequency efficiency in a correlated large-scale MIMO channel environment while requiring feedback of a small amount of channel state information (CSI).

BACKGROUND ART

Due to a drastic increase in data traffic, a Beyond-Fourth-Generation (B4G) mobile communication system requires 10 times an increase in frequency efficiency or more compared to a 4G system such as Third Generation Partnership Project (3GPP) Long Term Evolution (LTE). As physical layer techniques necessary to increase frequency efficiency 10 times or more as stated above, network MIMO, interference alignment, relay network, heterogeneous network, a large-scale MIMO technique, etc. are currently being mentioned.

The present invention relates to a massive MIMO (or large-scale antenna) system capable of obtaining a very strong effect as a technique for improving frequency efficiency. Existing large-scale antenna systems have been limited to a time-division duplex (TDD) scheme. This is because a frequency-division duplex (FDD) scheme has a problem that a large-scale antenna transmitter requires as many reference signals (RSs) and radio resources for CSI feedback as substantially impossible to obtain CSI.

In addition, since the number of users that can be simultaneously accommodated by a large-scale transmitting antenna remarkably increases, there occurs a practical problem in that the complexity of scheduling and precoding calculation becomes very higher than that of an existing system.

DISCLOSURE

Technical Problem

The present invention is directed to providing a multi-input multi-output (MIMO) transmission method capable of reducing the complexity of scheduling and precoding calculation even without increasing the amount of radio resources necessary for feedback of a reference signal (RS) and channel state information (CSI), and appropriate for a large-scale antenna system.

The present invention is also directed to providing an MIMO reception method capable of reducing the complexity of scheduling and precoding calculation even without increasing the amount of radio resources necessary for feedback of an RS and CSI, and appropriate for a large-scale antenna system.

Technical Solution

One aspect of the present invention provides a multi-input multi-output (MIMO) transmission method of a base station in a wireless communication system, the method including: obtaining statistical channel information on one or more pieces of user equipment (UE); classifying the one or more pieces of UE into one or more classes and one or more groups subordinate to the classes on the basis of the statistical channel information; determining group beamforming matrices for the respective divided groups; performing group beamforming transmission based on the group beamforming matrices to the pieces of UE belonging to the groups according to the groups, and obtaining instantaneous channel information; and scheduling the pieces of UE on the basis of the instantaneous channel information, and transmitting data to the pieces of UE on the basis of the scheduling.

Here, the obtaining of the statistical channel information may include: transmitting a channel state information (CSI)-reference signal (RS) to the one or more pieces of UE; and receiving feedback of the statistical channel information measured on the basis of the CSI-RS from the one or more pieces of UE.

Here, the obtaining of the statistical channel information may include measuring the statistical channel information on the basis of sounding RSs (SRSs) received from the one or more pieces of UE.

Here, the statistical channel information may include at least one of transmit correlation matrices, eigenvalues of the transmit correlation matrices, eigenvectors of the transmit correlation matrices, angle spreads (ASs), angles of departure (AoDs), and one or more long-term precoding matrix indicators (PMIs) that mean statistical channel information and are selected from a fixed codebook.

Here, the classifying of the one or more pieces of UE may include classifying pieces of UE having transmit correlation matrices similar to each other into one group. Here, the classifying the one or more pieces of UE may include classifying pieces of UE having valid eigenvectors of transmit correlation matrices similar to each other into one group, and classifying groups having high orthogonality between valid eigenvectors of transmit correlation matrices into one class.

Here, the determining of the group beamforming matrices may include determining the group-specific group beamforming matrices to be quasi-orthogonal to each other on the basis of the statistical channel information and a one-ring channel model. At this time, the group beamforming matrices may be determined to be quasi-orthogonal to each other through block diagonalization (BD).

Here, the obtaining of the instantaneous channel information may include: transmitting CSI-RSs to which the group-specific beamforming matrices have been applied or CSI-RSs to which the group-specific beamforming matrices have not been applied to the pieces of UE; and receiving feedback of the instantaneous channel information measured on the basis of the CSI-RSs to which the group-specific beamforming matrices have been applied or the CSI-RS to which the group-specific beamforming matrices have not been applied from the pieces of UE.

Here, the obtaining of the instantaneous channel information may include measuring the instantaneous channel information on the basis of SRSs received from the pieces of UE.

Here, the instantaneous channel information may include at least one of information on dominant eigenvector matrices of transmit correlation matrices, adaptive codebook indices, fixed codebook indices, single user channel quality indicators (SU-CQIs), and multi-user CQIs (MU-CQIs), and at least one of group interference measurement information and rank information (RI). Here, the MIMO transmission method may further include notifying, at the base station, the pieces of UE of whether to operate in a SU-MIMO mode or a MU-MIMO mode, wherein, when the base station and the pieces of UE operate in the SU-MIMO mode, the channel information may include the SU-CQIs, and when the base station and the pieces of UE operate in the MU-MIMO mode, the channel information may include at least one of the MU-CQIs according to the pieces of UE.

Here, the scheduling of the pieces of UE on the basis of the instantaneous channel information may include scheduling, at the base station, the pieces of UE belonging to the respective groups and the respective classes independently according to the groups and the classes.

Another aspect of the present invention provides an MIMO reception method of UE in a wireless communication system, the method including: receiving a signal to which a group beamforming matrix for a group including the UE has been applied; generating instantaneous channel information using an RS to which the group beamforming matrix has been applied or an RS to which the group beamforming matrix has not been applied; and feeding back the instantaneous channel information to a base station.

Here, the MIMO reception method may further include feeding back, at the UE, statistical channel information measured on the basis of a CSI-RS received from the base station to the base station, wherein the group beamforming matrix may be determined using the statistical channel information.

Here, the group beamforming matrix may be determined on the basis of an SRS transmitted by the UE.

Here, the instantaneous channel information may include at least one of information on a dominant eigenvector matrix of a transmit correlation matrix, an adaptive codebook index, a fixed codebook index, a SU-CQI, and a MU-CQI, and at least one of group interference measurement information and RI.

Here, the MIMO reception method may further include notifying, at the base station, the UE of whether to operate in a SU-MIMO mode or a MU-MIMO mode, wherein, when the base station and the UE operate in the SU-MIMO mode, the instantaneous channel information may include the SU-CQI, and when the base station and the UE operate in the MU-MIMO mode, the instantaneous channel information may include the at least one MU-CQI according to the UE.

Here, pieces of UE having statistical channel information-based transmit correlation matrices similar to each other may be classified into one group. Here, pieces of UE having valid eigenvectors of transmit correlation matrices similar to each other may be classified into one group, and groups having high orthogonality between valid eigenvectors of transmit correlation matrices may be classified into one class.

Advantageous Effects

In a multi-input multi-output (MIMO) transmission and reception method according to the present invention, pieces of user equipment (UE) are classified into groups having quasi-orthogonality between themselves using similarity between transmit correlation matrices (or channel covariance matrices) of the pieces of UE, and the groups are caused to operate as virtual sectors, so that scheduling can be performed independently according to the groups.

In the present invention, since not all pieces of UE but some pieces of UE can be independently scheduled according to the aforementioned concept of virtual sectors (i.e., group-specific independent scheduling), it is possible to remarkably reduce system complexity for performing multi-user (MU)-MIMO.

Also, in the present invention, group-specific reference signals (GRSs) are introduced, and in practice, it is possible to introduce MU-channel quality indicators (CQIs) through the GRSs, so that MU-MIMO can be effectively performed.

In addition, when the MIMO transmission and reception method of the present invention is used, a specific adaptive codebook rather than a fixed codebook may be used for UE (or a UE group), and thus it is possible to ensure better performance than a fixed codebook such as Long Term Evolution (LTE).

Furthermore, in the present invention, it is possible to reduce a load of RSs and UE feedback resources of a frequency-division duplex (FDD)-based large-scale antenna system to a practicable level due to GRSs and an adaptive codebook.

DESCRIPTION OF DRAWINGS

FIG. 3 is a flowchart illustrating a frequency-division duplex (FDD)-based downlink MIMO transmission and reception method according to the present invention.

FIG. 4 is a conceptual diagram showing an example of UE grouping in a MIMO transmission and reception method according to the present invention.

DESCRIPTION OF MAJOR SYMBOLS IN THE ABOVE FIGURES

Figure 1:
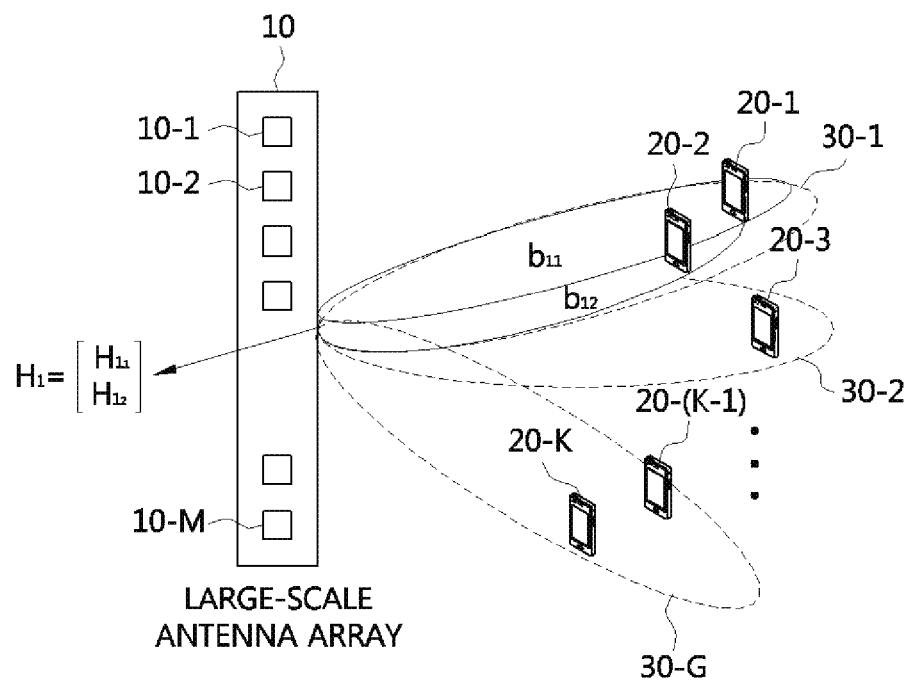
FIG. 1 is a conceptual diagram of spatial division among user groups in a multi-input multi-output (MIMO) transmission and reception method according to the present invention.

10: Large-scale antenna array
10-1 to 10-M: Antenna elements
20-1 to 20-K: pieces of UE
30-1 to 30-G: Groups

MODES OF THE INVENTION

While the present invention can be modified in various ways and take on various alternative forms, specific embodiments thereof are shown in the drawings and described in detail below as examples.

However, there is no intent to limit the present invention to the particular forms disclosed. On the contrary, the present invention is to cover all modifications, equivalents, and alternatives falling within the spirit and scope of the appended claims.

The terminology used herein to describe embodiments of the invention is not intended to limit the scope of the invention. Singular forms include plural forms unless the context clearly indicates otherwise. It will be further understood that the term "comprises," "comprising," "includes," or "including," when used herein, specifies the presence of stated features, integers, steps, operations, elements, components, or groups thereof, but do not preclude the presence or addition of one or more other features, integers, steps, operations, elements, components, or groups thereof.

Unless otherwise defined, all terms including technical and scientific terms used herein are to be interpreted as is customary in the art to which the present invention belongs. It will be further understood that terms as those defined in a generally used dictionary are to be interpreted as having meanings in accordance with the meanings in the context of the relevant art and not in an idealized or overly formal sense unless clearly so defined herein.

The term "user equipment (UE)" used herein may be referred to as a mobile station (MS), user terminal (UT), wireless terminal, access terminal (AT), terminal, subscriber unit, subscriber station (SS), wireless device, wireless communication device, wireless transmit/receive unit (WTRU), mobile node, mobile, or other terms. Various embodiments of UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or UE having a combination of such functions, but are not limited to these.

The term "base station" used herein generally denotes a fixed or moving point that communicates with UE, and may be a common name for Node-B, evolved Node-B (eNode-B), base transceiver system (BTS), access point, relay, femto-cell, and so on.

Hereinafter, exemplary embodiments of the present invention will be described in detail with reference to the appended drawings. To aid in understanding the present invention, like numbers refer to like elements throughout the description of the figures, and the description of the same element will not be reiterated.

Summary of MIMO Transmission and Reception Method According to Present Invention A multi-input multi-output (MIMO) transmission and reception method according to the present invention is applied to the uplink and downlink of cellular communication.

In description below, it is assumed that one cell consists of a base station having M antennas and K users (pieces of UE) each having N antennas, and transmitting antenna correlation of each piece of UE is high (i.e., an angle spread (AS) is small). For example, in a channel environment in which downlink urban macro and line of sight (LOS) components are strong, transmitting antenna correlation is high.

For convenience, it is assumed that the K users can be classified into G groups that can be spatially separated according to similarity of transmitting antenna correlation, and each group includes K' users. For convenience, it is assumed that all the groups consist of the same number of users.

A channel model taken into consideration in the present invention is Equation 1 below.

$$H = R_R^{1/2} H_W R_T^{1/2}$$ [Equation 1]

Here, $H_W$ is an independently and identically distributed (i.i.d.) channel matrix, $R_T$ is a transmit correlation matrix, and $R_R$ is a receive correlation matrix. For convenience, a so-called one-ring channel model is assumed in multi-user (MU)-MIMO, and it is assumed that $R_R = I$, that is, there is no receive correlation.

A transmission signal model proposed by the present invention is Equation 2 below.

$$x = BPd$$ [Equation 2]

Here, B is a beamforming matrix based on statistical characteristics of a channel, P is a precoding matrix based on channel information $\tilde{H} = HB$, and d is a data symbol vector.

A reception signal model proposed by the present invention is Equation 3 below.

$$y = HBPd + z$$ [Equation 3]

Here, Z denotes a noise signal, and HB can be presented by Equation 4 below.

$$HB = \begin{bmatrix} H_1 B_1 & H_1 B_2 & \ldots & H_1 B_G \\ H_2 B_1 & H_2 B_2 & \ldots & H_2 B_G \\ \vdots & \vdots & \ddots & \vdots \\ H_G B_1 & H_G B_2 & \ldots & H_G B_G \end{bmatrix} \approx \begin{bmatrix} H_1 B_1 & 0 & \ldots & 0 \\ 0 & H_2 B_2 & \ldots & 0 \\ \vdots & \vdots & \ddots & \vdots \\ 0 & 0 & \ldots & H_G B_G \end{bmatrix}$$ [Equation 4]

Here, $H_g$ is an overall channel matrix of group g, and $B_g \in \mathbb{C}^{M \times b}$ is a beamforming matrix of group g. In Equation 4 above, the approximate equality sign corresponds to a case in which the condition of Equation 5 below is satisfied.

$$H_m B_n = 0, m \neq n$$ [Equation 5]

Then, $P = \text{diag}(P_1, \ldots, P_G)$.

The core of the MIMO transmission and reception method proposed in the present invention is to set $B_g$ to satisfy the condition and schedule users having such a beamforming matrix for the same time.

FIG. 1 is a conceptual diagram of spatial division among user groups in a MIMO transmission and reception method according to the present invention.

Referring to FIG. 1, a base station has a large-scale antenna array 10 consisting of M antenna elements 10-1, 10-2, . . . , and 10-M. There are K pieces of active UE 20-1, 20-2, . . . , and 20-K, and the K pieces of active UE are classified into G groups. For example, a first group 30-1 includes the first piece of UE 20-1 and the second piece of UE 20-2, and a second group 30-2 includes the third piece of UE 20-3. A $G^{th}$ group 30-G includes the $(K-1)^{th}$ piece of UE 20-(K-1) and the $K^{th}$ piece of UE 20-K.

Here, a channel matrix of the first group 30-1 consisting of the first piece of UE 20-1 and the second piece of UE 20-2 corresponds to $H_1$.

Next, description will be made regarding dimensional reduction of an instantaneous channel matrix that can be obtained using the MIMO transmission and reception method proposed in the present invention. First, it is assumed that K users are indexed as Equation 6 below to present group indices. $g_k$ denotes an index of a $k^{th}$ piece of UE in group g.

$$g_k = (g-1) \times K' + k, g=1, \ldots G, k=1, \ldots, K'$$ [Equation 6]

Meanwhile, it is effective to use a receive beamforming or combining matrix of a receiver when receive correlation is high. Then, it is possible to know that dimensions of an instantaneous channel matrix to be fed back to a base station by a user according to the transmission and reception method of the present invention is reduced as presented in Equation 7 below.

$$H_{g_k}:N \times M \Rightarrow \tilde{H}_{g_k}=C_{g_k}H_{g_k}B_{g_k}:c \times b \qquad \text{[Equation 7]}$$

Here, $C_{g_k} \in \mathbb{C}^{c \times N}$ is a receive combining matrix of a user $g_k$, and $N \geq c$, $M \geq b$. In particular, since it is expected that a case of $N \gg c, M \gg b$ will frequently occur in a large-scale antenna system, it is possible to remarkably reduce dimensions of an instantaneous channel matrix $\tilde{H}_{g_k}$ that a user should feed back to a base station. In addition, each group performs precoding on the basis of $\tilde{H}_g$, the complexity of precoding matrix calculation also is significantly reduced. It is possible to know that the effects are obtained in a single user (SU)-MIMO system as well.

Next, assuming for convenience that users of group g have the same transmit correlation matrix, various forms that $B_g$ has according to statistical information and an antenna arrangement given to a base station will be described.

A. Case of Base Station Knowing Transmit Correlation Matrix Information on Each Group Eigenvectors of a transmit correlation matrix of group g can be fed back from a user or estimated using an uplink pilot signal. A transmit correlation matrix is statistical information, and thus a base station may receive feedback of the corresponding information at enough time intervals. In this case, it is possible to obtain $B_g$ in a variety of the following forms.

$B_g$ may be a matrix consisting of as many eigenvectors as the number of meaningful ranks of the transmit correlation matrix of group g.

When L subarrays are arranged at enough intervals as a large-scale antenna array, the transmit correlation matrix of group g becomes a block diagonal matrix. In this case, channel information that each user should feed back becomes an eigenvector of a block matrix disposed on a diagonal, and thus a load of feedback can be remarkably reduced. A distributed antenna system can be understood as corresponding to a special case of the large-scale antenna array divided into the L subarrays.

When a practical rank (i.e., a rank excluding too small eigenvalues) of the transmit correlation matrix of group g is large, in order to make transmit correlation matrices of groups orthogonal to each other, a sufficient dimension of $H_gB_g$ matrix can be ensured by reducing the number of groups, and then inter-group interference can be removed through block diagonalization (BD). Alternatively, it is possible to control inter-group interference by designing $B_g$ of each group to have b that is smaller than a meaningful rank of the transmit correlation matrix of group g.

B. Case of Base Station Not Knowing Transmit Correlation Matrix Information on Each Group It is possible to have $B_g$ in the following form.

Virtual sectors can be made using predetermined fixed beamforming to spatially separate user groups. Here, an example of fixed beamforming can be the Third Generation Partnership Project (3GPP) Long Term Evolution (LTE) Rel. 10 codebook based on unitary beamforming, a user can feed back a single beam index and a plurality of beam indices of strong signals among received beams to a base station, and the base station should be able to appropriately perform scheduling using the corresponding information so that there is little interference between user groups.

The user may feedback a transmission angle spread (AS) and angle of departure (AoD) extracted from a transmit correlation matrix to the base station.

The core of scheduling proposed in the present invention is to make HB as close to a block diagonal matrix as possible. Thus, the scheduling generally includes two steps.

In a first step, groups are made using information such as eigenvectors or beam indices of transmit correlation matrices of all users, so that HB becomes a block diagonal matrix. For this reason, the respective groups independently perform intra-group scheduling without causing significant interference to each other. At this time, a base station may have to signal beamforming matrices of the respective groups or respective users to the users.

In a second step, scheduling is performed using an instantaneous channel matrix $\tilde{H}_{g_k}$ fed back by users in a group, and spatial multiplexing is performed through precoding.

Due to the aforementioned two-stage scheduling, the complexity of scheduling and precoding calculation of a system can be remarkably reduced.

Downlink pilots can have two forms.

A first form is a pilot in a general form transmitted in all directions of a sector. For example, the first form may be in accordance with a pilot signal having the same structure as 3GPP LTE.

A second form is a pilot signal multiplied by a beamforming matrix. In case of fixed beamforming, the second form is a pilot form necessary for a user to transmit a beam index.

A large-scale MIMO uplink has a problem in that a dimension of a reception channel matrix is large, and the calculation complexity of a receiving algorithm exponentially increases. The present invention shows that an uplink MU-MIMO reception method for solving this problem can be obtained by applying the principle of the above-described downlink MU transmission method to a reception method. In other words, since a base station knows all channel information through an uplink pilot, it is possible to significantly reduce dimensions of a reception vector of each group and lower the calculation complexity of a receiving algorithm to a practicable level when reception beamforming is performed to remove inter-group interference through an appropriate scheduling.

Figure 2:
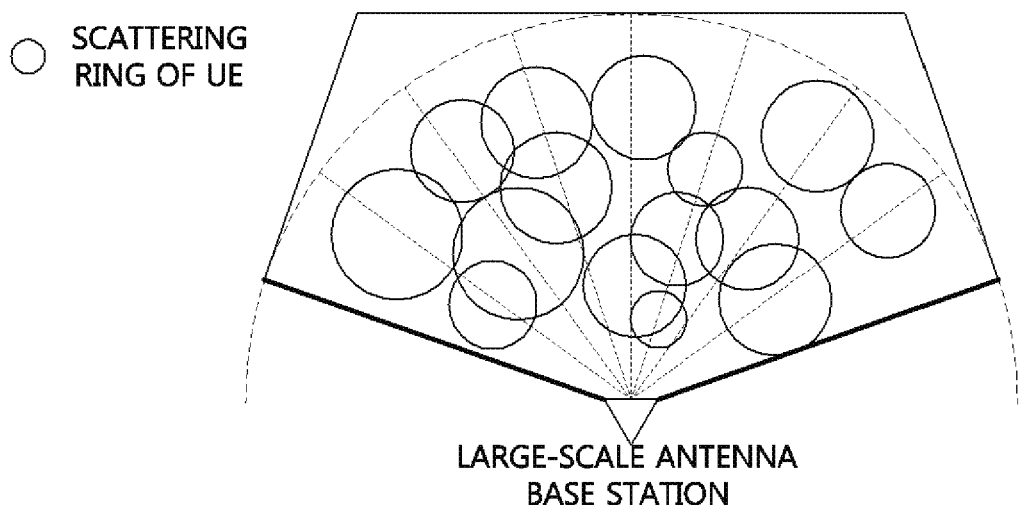
FIG. 2 is a conceptual diagram showing an example of distribution of locations of pieces of user equipment (UE) in one sector of a 3-sector base station and distribution of radiuses of scatterers.

FDD-Based Downlink MIMO Transmission and Reception Method According to Present Invention FIG. 2 is a conceptual diagram showing an example of distribution of locations of pieces of UE in one sector of a 3-sector base station and distribution of radiuses of scatterers. The present invention will be described below with reference to FIG. 2 in parallel.

A) Entire Procedure

FIG. 3 is a flowchart illustrating an FDD-based downlink MIMO transmission and reception method according to the present invention.

Referring to FIG. 3, an FDD-based downlink MIMO transmission and reception method according to the present invention is a MIMO transmission method of a base station in a wireless communication system, and may include: a step of obtaining statistical channel information on one or more pieces of UE (S310); a step of classifying the one or more pieces of UE into one or more classes and one or more groups subordinate to the classes on the basis of the statistical channel information (S320); a step of determining group beamforming matrices for the respective divided groups (S330); a step of performing group beamforming transmission based on the group beamforming matrices to the pieces of UE belonging to the groups according to the groups, and obtaining instantaneous channel information (S340); and a step of scheduling the pieces of UE on the basis of the instantaneous channel information and transmitting data to the pieces of UE on the basis of the scheduling (S350).

The respective steps will be described in brief below, and operation and elements constituting each step will be described later in sections B) to F). Also, a fixed codebook-based procedure and an adaptive codebook-procedure will be described later.

In step S310, a base station can receive feedback of statistical channel information from one or more pieces of UE or measure the statistical channel information through an uplink sounding reference signal (SRS). The statistical channel information can include at least one of transmit correlation matrices, eigenvalues of the transmit correlation matrices, eigenvectors of the transmit correlation matrices, ASs, AoDs, and one or more long-term precoding matrix indicators (PMIs) that mean statistical channel information and are selected from a fixed codebook.

Statistical channel information can be obtained when a base station sets and transmits a channel state information (CSI)-reference signal (RS) to the pieces of UE and receives feedback of results measured through the received CSI-RS, or can be measured by the base station through an uplink SRS transmitted by UE. Respective pieces of information included in the statistical channel information will be described later.

In step S320, the base station can classify the one or more pieces of UE into one or more classes and one or more groups subordinate to the classes on the basis of the statistical channel information. According to a procedure selected from a fixed codebook-based procedure and an adaptive codebook-based procedure, step S320 can be configured differently. For example, according to the fixed codebook-based procedure, the pieces of UE feed back long-term PMIs selected from a fixed codebook as statistical channel information, which means that the pieces of UE designate classes and groups to which the pieces of UE themselves will belong in the first instance. At this time, the base station may ignore the class and the group selected by the pieces of UE, select optimum classes and groups in the second instance, and notify the pieces of UE of the selected optimum classes and groups. The detailed procedure based on a fixed codebook will be described later. Also, statistical channel information and group/class classification will be described later in section B).

In step S330, group beamforming matrices for the respective divided groups are determined.

At this time, in the fixed codebook-based procedure, group beamforming matrices are selected from among previously generated group beamforming matrices. On the other hand, in the adaptive codebook-based procedure, group beamforming matrices are generated on the basis of the received statistical channel information. Generation of group beamforming matrices will be described later in section C).

In step S340, the base station performs group beamforming transmission based on the group beamforming matrices to the pieces of UE belonging to the groups according to the groups. The base station can receive feedback of instantaneous channel information measured from CSI-RS signals to which group beamforming has been applied or CSI-RS signals to which group beamforming has not been applied, or can measure the instantaneous channel information through SRSs received from the pieces of UE. RSs of the present invention will be described later in section D).

Here, the instantaneous channel information can be fed back to the base station using an implicit feedback scheme or an explicit feedback scheme.

The instantaneous channel information may include at least one of information on dominant eigenvector matrices of the transmit correlation matrices, adaptive codebook indices, fixed codebook indices, SU-channel quality indicators (SU-CQIs), and MU-CQIs, and at least one of group interference measurement information and rank information (RI).

A detailed feedback method of instantaneous channel information will be described later with the fixed codebook-based procedure and the adaptive codebook-based procedure.

Lastly, in step S350, the base station selects pieces of UE to service according to the respective groups through instantaneous channel information fed back from the pieces of UE and a scheduling algorithm, and transmits a control signal and data.

At this time, the base station can transmit demodulation group-specific RSs (DM-GRSs) to which group-specific beamforming matrices are applied to the pieces of UE with the data, and the pieces of UE can demodulate the data using the DM-GRSs.

In the FDD-based downlink MIMO transmission and reception method according to the present invention, a fixed codebook-based MIMO transmission method of a base station and an adaptive codebook-based MIMO transmission method of a base station will be described in further detail below. Although the MIMO transmission methods are described from the viewpoint of a base station, MIMO reception methods of UE corresponding to the MIMO transmission methods can also be described by inference.

First, the fixed codebook-based procedure will be described.

An example of operation based on a fixed codebook of the FDD-based downlink MIMO transmission method according to the present invention can include a step of transmitting a CSI-RS (1-1), a step of receiving information indicating a class and a group determined through the CSI-RS and to which each of one or more pieces of UE belongs from the piece of UE (1-2), a step of notifying the pieces of UE of the classes and the groups of the pieces of UE determined on the basis of the information (1-3), a step of generating or selecting group-specific beamforming matrices on the basis of the determined classes and groups (1-4), a step of transmitting CSI-RSs to which the group-specific beamforming matrices are applied to the respective groups (1-5), a step of receiving channel information measured on the basis of the CSI-RSs to which the group-specific beamforming matrices are applied from the pieces of UE (1-6), and a step of scheduling the pieces of UE on the basis of the channel information, and transmitting data to the pieces of UE on the basis of the scheduling (1-7). Description will be made below under the assumption that channel information feedback from UE is implicit channel feedback.

The respective steps will be described in further detail below.

In step 1-1, a base station sets and transmits a general CSI-RS to pieces of UE. Here, the general CSI-RS may denote a CSI-RS to which no group-specific beamforming matrix to be described later has not been applied.

In step 1-2, the pieces of UE select optimum classes and groups on the basis of the CSI-RS transmitted by the base station, and feed back information indicating the selected classes and groups to the base station. The information indicating the classes and groups can be configured to indicate one or more classes and groups. In step S310, the pieces of UE can select $B_s^{(t)}$ that maximizes $\|h_i^H B_g^{(t)}\|$ or the average $$\frac{1}{N}\sum_{n=1}^{N} \|h_i^H(n)B_g^{(t)}(n)\|$$

of N slots as a long-term PMI using the CSI-RS transmitted by the base station, and feed back the long-term PMI to the base station as information indicating classes and groups. The long-term PMI denotes statistical channel information on UE. Since a class and a group of UE change very slowly according to movement of the UE, the long-term PMI may be fed back for a very long term or fed back when the long-term PMI exceeds a specific threshold value, that is, only when there is a change. When p long-term PMIs are fed back, for example, p long-term PMIs in decreasing order of the selection reference values are fed back.

Meanwhile, in order for UE to transmit information indicating a class and a group as a long-term PMI, the base station can provide information on a used fixed codebook to the UE. For example, when various fixed codebooks are used according to the number and a pattern of antennas of the base station and a type (urban/rural and macro/micro) of the base station, the base station can provide information on the fixed codebooks in use to the UE. Such information on a fixed codebook can be transferred to the UE, for example, using a physical broadcast channel (PBCH).

In step 1-3, the base station classifies the pieces of UE according to classes and groups on the basis of the information fed back from the pieces of UE. In this process, classes and groups different from the classes and groups reported by the pieces of UE in step 1-2 can be assigned to the pieces of UE through class and group rearrangement of the base station. Thus, when the pieces of UE have fed back information indicating several classes and groups in step 1-2, or classes and groups to which the pieces of UE belong are changed through class rearrangement of the base station, the base station notifies the corresponding pieces of UE of the determined classes and groups of the pieces of UE through a control signal.

In step 1-4, the base station generates or selects group-specific beamforming matrices on the basis of the determined classes and groups. At this time, the base station may generate optimum beamforming matrices for the respective classified groups, or select optimum beamforming matrices from among previously generated beamforming matrices according to the groups. In step 1-5, the base station transmits CSI-RSs to which the group-specific beamforming matrices are applied to the respective groups.

In step 1-6, the pieces of UE measure channel information using the CSI-RSs transmitted by the base station and to which the group-specific beamforming matrices are applied, and report the channel information to the base station. Here, the channel information can include at least one of SU-CQIs and MU-CQIs, short-term PMIs, and rank indicators (RIs).

A MU-CQI is calculated as a self-signal-to-interference plus noise ratio (SINR). Here, interference within the same group and interference from other groups all are calculated and reflected in an interference signal. Basically, the pieces of UE calculate interference assuming that all beams of all the groups are used. This is possible because the pieces of UE know their channels and beams $B_g^{(t)}$ of all the groups. Meanwhile, when the number of users in a cell is small, a control signal is necessary for the base station to reduce the number of beams used by each group and notify the pieces of UE of the corresponding beam indices. At this time, the base station notifies the pieces of UE in the corresponding groups of group-specific used beams, so that the pieces of UE accurately estimate interference of other groups and calculate MU-CQIs. Also, since the pieces of UE simultaneously feed back SU-CQIs and MU-CQIs, the base station may dynamically select and schedule the pieces of UE, or notify the pieces of UE of whether to operate in a SU-MIMO mode or a MU-MIMO mode using a control signal, so that the pieces of UE feed back the SU-CQIs or one or more MU-CQIs according to the respective pieces of UE.

Lastly, in step 1-7, the base station finds an optimum UE combination on the basis of the channel information, schedules the pieces of UE, and transmits data to the pieces of UE on the basis of the scheduling.

When a base station performs optimum scheduling on the basis of MU-CQIs of UE, selected pieces of UE have little inter-group interference. Thus, pieces of UE selected from different groups can demodulate their data through DM-GRSs that are quasi-orthogonal to each other and use the same resources. Interference between different groups can be additionally reduced using a quasi-orthogonal sequence, and interference between different users in the same group can be removed using an orthogonal sequence.

Meanwhile, a design standard for generating a fixed codebook consisting of the long-term PMI mentioned in step 1-2 and the short-term PMI mentioned in step 1-6 is as follows. First, description will be made under the assumption of a co-polarization antenna.

A fixed codebook consists of T classes and G groups belonging to each class.

The respective classes may have different number of groups. A matrix $U_g^{(t)}$ forming eigenvector spaces of groups constituting one class is made using the one-ring channel model. Parameters necessary to this end are ASs and AoDs of the groups. An AS of a group is determined by AS distribution of UE in a cell, each group AoD is determined comprehensively according to the following two standards.

Eigenvector spaces of respective groups should be as orthogonal as possible. This is intended to reduce inter-group interference.

AoDs of respective groups should be disposed as equally as possible. This is intended to minimize a disagreement between an eigenvector space of UE and an eigenvector space of a group to which the UE belongs.

A BD scheme is applied to class-specific $U_g^{(t)}$ sets obtained using the aforementioned method, and thereby a beamforming matrix $B_g^{(t)}$ constituting a codebook is generated. In this way, inter-group interference can be further reduced. Here, the long-term PMI denotes an index (t, g) of $B_g^{(t)}$, and the short-term PMI denotes one or a plurality of column vectors in $B_g^{(t)}$ corresponding to UE according to a transmission rank (RI).

The codebook has been described above under the assumption of a co-polarization antenna. On the other hand, in case of a cross-polarization antenna, two polarization antenna arrays are independently processed to have M/2 beam vectors per one polarity, and it is possible to configure a long-term PMI and a short-term PMI in the same way as described above. Also, like in the LTE scheme, a co-phasing parameter can be prepared to induce constructive combining between beams of two polarization antennas. However, in this case, UE should accurately estimate at least interference of other users in a group to calculate a MU-CQI. To this end, the UE calculates a plurality of MU-CQIs according to the number of cases of co-phasing parameters of the other users in the group, and feeds back co-phasing parameters to the respective users, so that a base station schedules users in the group. At this time, the UE can reduce the number of feedback bits by transmitting a first MU-CQI and only offsets of the other MU-CQIs with respect to the first MU-CQI.

The above procedure has been described on the basis of an existing CSI-RS. Meanwhile, an existing CSI-RS can be replaced by a long-term CSI-RS and a short-term CSI-GRS. Here, the CSI-GRS is a GRS beamformed using $B_g^{(t)}$ and is transmitted by sharing the same resources between groups, thereby reducing consumption of RS resources. The long-term CSI-RS is intended for UE to estimate and feed back a long-term PMI, and the short-term CSI-GRS is intended to feed back a short-term PMI.

Next, the adaptive codebook-based procedure will be described.

An example of operation based on an adaptive codebook of the FDD-based downlink MIMO transmission method according to the present invention can include: a step of obtaining statistical channel information on one or more pieces of UE (2-1); a step of classifying the one or more pieces of UE into classes and groups on the basis of the statistical channel information, and generating group-specific beamforming matrices (2-2); a step of transmitting CSI-RSs to which the group-specific beamforming matrices are applied to the respective groups (2-3); a step of receiving channel information measured on the basis of the CSI-RSs to which the group-specific beamforming matrices are applied from the pieces of UE (2-4); and a step of scheduling the pieces of UE on the basis of the channel information, and transmitting data to the pieces of UE on the basis of the scheduling (2-5).

The respective steps will be described in further detail below.

In step 2-1, a base station obtains statistical channel information on one or more pieces of UE. At this time, the base station can measure the statistical channel information using SRSs transmitted by the pieces of UE, or transmit long-term CSI-RSs to the pieces of UE and receive feedback of the statistical channel information measured by the pieces of UE. An example of the statistical channel information may be eigenvector matrices of the pieces of UE. Alternatively, another example of the statistical channel information may be ASs and AoDs of the pieces of UE.

In step 2-2, the base station classifies the pieces of UE according to classes and groups using the statistical channel information obtained in step 2-1, and can generate optimal beamforming matrices $B_g^{(t)}$ for the respective groups. Such $B_g^{(t)}$ constitute an adaptive codebook that changes very slowly along with movement of the pieces of UE.

In step 2-3, the base station sets CSI-GRSs that are beamformed using the beamforming matrices generated in step 2-2, and broadcasts the CSI-GRSs. Here, the CSI-GRSs are GRSs beamformed using $B_g^{(t)}$ and transmitted by sharing the same resources between groups, thereby reducing consumption of RS resources.

In step 2-4, the pieces of UE measure channel information using the CSI-RSs transmitted by the base station and to which the group-specific beamforming matrices are applied, and report the channel information to the base station. Here, the channel information can include at least one of SU-CQIs and MU-CQIs, short-term PMIs, and RIs.

Here, a method of determining the MU-CQIs in the channel information and a method of signaling the channel information are the same as those in case of a fixed codebook described above, and detailed description thereof will be omitted.

Lastly, in step 2-5, the base station finds an optimum UE combination on the basis of the channel information, schedules the pieces of UE, and transmits data to the pieces of UE on the basis of the scheduling.

When a base station performs optimum scheduling on the basis of MU-CQIs of UE, selected pieces of UE have little inter-group interference. Thus, pieces of UE selected from different groups can demodulate their data through DM-GRSs that are quasi-orthogonal to each other and use the same resources. Interference between different groups can be additionally reduced using a quasi-orthogonal sequence, and interference between different users in the same group can be removed using an orthogonal sequence.

To reduce resource consumption, the aforementioned CSI-GRS and DM-GRS do not use separate resources, but rather may be combined into one GRS and used.

In other words, the DM-GRS may serve as the CSI-GRS. In this case, when the UE is instructed to operate in the SU-MIMO mode, it is possible to demodulate its physical downlink shared channel (PDSCH) through the GRS. To solve this problem, the base station transmits quasi-orthogonal DM-RSs based on SU-CQIs using separate resources in subframes in which the GRS for CSI is transmitted at intervals of, for example, 5 ms, so that the UE demodulates the PDSCH.

B) UE Grouping 1) Statistical Channel Information

This paragraph describes UE grouping according to statistical channel information that is a core step of the above-described MIMO transmission and reception method according to the present invention. First, a base station receives feedback of statistical channel information through a CSI-RS, or obtains the statistical channel information through an uplink SRS. The statistical channel information can have the following forms.

Transmit correlation matrix or channel covariance matrix
Valid eigenvalue and eigenvector of transmit correlation matrix
AS and AoD
Long-term PMI denoting statistical channel information on UE A transmit correlation matrix that is a statistical characteristic of a UE channel is a statistical value that changes very slowly along with movement of UE.

This is because a scatterer environment changes only when UE moves. Also, MU-MIMO is generally used by low-speed UE only. The simplest form of a transmit correlation matrix estimation scheme is $R_{g_k}=E[h_{g_k}h_{g_k}^H]$ in which the one-ring channel model is assumed.

2) UE Grouping Procedure

A summary of UE grouping is as follows. A base station classifies pieces of UE $g_k$ having similar valid eigenvector (an eigenvector corresponding to a valid eigenvalue) matrices $U_{g_k}$ into one group, thereby creating a plurality of groups. Also, groups having high orthogonality between their eigenvectors constitute one class.

While classes that are classified in this way use different time/frequency resources, groups in one class are allocated the same time/frequency resources. The number of classes is referred to as T.

A method of finding groups having high orthogonality between their eigenvectors can be implemented in several ways. An eigenvector matrix $U_g$ of a group having high orthogonality should satisfy a relationship shown in Equation 8 below with an eigenvector matrix $U_{g'}$ of another group.

$$U_g^H U_{g'} \approx 0, \forall g' \neq g \quad \text{[Equation 8]}$$

In this paragraph, a simple $U_g$ calculation method is proposed. First, in consideration of eigenvectors of pieces of UE or distribution of ASs and AoDs, the base station estimates the number of classes and the number of groups and reference angles of the respective classes. It is possible to calculate AoDs of G-1 beam vectors orthogonal to the reference angles (i.e., a total of G orthogonal beam vectors), group transmit correlation matrices are calculated according to a formula of the one-ring channel model, and the corresponding group eigenvector matrices $U_g$ are generated through singular value decomposition (SVD).

The base station measures similarity between the given class-specific group eigenvector matrices and eigenvector matrices $U_i$ of the respective pieces UE through inner products of them, determines groups of the most similar classes, and classifies the pieces of UE into the corresponding groups. Similarity between an eigenvector of a UE correlation matrix and that of a group correlation matrix can be defined as Equation 9 below.

$$\|U_i^H U_g\| \leq \alpha_0, i \in [1:K] \quad \text{[Equation 9]}$$

Here, $\|\cdot\|$ is a Frobenius norm.

Here, group classification is rearranged by adjusting the initial number of classes and the initial number of groups and a reference angle of a class whose similarity value does not satisfy a reference value $\alpha^0$, so that the similarity value satisfies the reference value. Such group classification changes very slowly, and thus an increase in calculation complexity caused by the change will be limited.

FIG. 4 is a conceptual diagram showing an example of UE grouping in a MIMO transmission and reception method according to the present invention.

FIG. 4 shows how pieces of UE can be grouped according to the present invention in the example of distribution of UE and scatterers shown in FIG. 2 above.

Referring to FIG. 4, circles drawn with dotted lines denote locations of pieces of UE classified into class 1 and circles of scatterers, and circles drawn with solid lines denote pieces of UE of class 2. Class 1 consists of four groups, and class 2 consists of three groups. Dotted straight lines and solid straight lines denote reference angles used for generating orthogonal beams of the respective groups.

Thus, it is possible to see a result of UE grouping performed so that there are the circles of pieces of UE belonging to each class with their centers located around the corresponding dotted or solid straight line. Also, it is possible to see that two circles filled with diagonal lines constitute one group in class 1.

When the total number of pieces of UE is not enough, the number of pieces of UE per class decreases, and the number of pieces of UE per group also decreases in proportion to the decrease. This results in deterioration of the frequency efficiency of the MIMO transmission and reception method according to the present invention, but on second thoughts, a small number of pieces of UE in a cell implies little system load, which means that there is no problem in service even with low frequency efficiency.

In addition, since large-scale antenna MIMO technology such as the present invention is intended to simultaneously provide service to many users using the same resources and to improve quality of experience (QoE) by causing a system to bear overload at peak time, it may be assumed that the number of pieces of UE is about ten times a number s of layers simultaneously served using the same resources. Furthermore, in case of multi-antenna UE, respective antennas may be regarded as separate users and scheduled, and thus the assumption about s is realistic.

The UE grouping has been described above assuming a case in which rays of a transmission signal transmitted to UE spreads as much as an AS. Meanwhile, when a scatterer such as a skyscraper is around a base station, or in case of a micro cell base station, rays of a transmission signal may be transmitted with two or more AoDs and ASs. In this case, the corresponding UE belongs to two or more groups, is classified into the groups and managed, and performs UE feedback necessary for the respective groups.

In addition, the UE grouping described above is under the assumption that a base station knows statistical channel information on all pieces of UE. However, when the assumption is not satisfied, the base station requires feedback of statistical channel information from the pieces of UE for UE grouping. For example, in a method in which the base station transmits a long-term CSI-RS and the pieces of UE feed back statistical channel information on the basis of a fixed codebook or estimate and feed back ASs and AoDs, the base station obtains the statistical channel information on the pieces of UE. The base station performs the above-described UE grouping with reference to the UE feedback.

At this time, by determination of the base station, UE may not be classified into a group corresponding to an AoD fed back by the UE itself, but may be classified into another class and group that are systematically more appropriate. Thus, in this case, the base station should notify the UE of the class and group to which the UE belongs.

C) Group Beamfoming Matrix

1) Generation of Group Beamforming Matrix

A beamforming matrix of the corresponding group is generated from a universal set or a subset of a group eigenvector matrix $U_g$ selected through the above-described UE grouping. In other words, when a rank (or a column size) of the group beamforming matrix is made to be the same as r* of the group eigenvector matrix, the group beamforming matrix is as Equation 10 below.

$$B_g = U_g \quad \text{[Equation 10]}$$

Such group beamforming matrices become quasi-orthogonal to each other through group classification and satisfy Equation 8. Eventually, group beamforming matrices satisfy Equation 8 and enable the present invention to perform large-scale MU-MIMO while minimizing a load of RSs and UE feedback resources.

The aforementioned generation of a basic group beamforming matrix $B_g$ satisfies Equation 8 under the assumption that the above-described UE grouping is appropriately performed and group eigenvectors $U_g$ are quasi-orthogonal to each other. However, when the number of active pieces of UE in a base station is small and it is impossible to make a number T of classes large, the UE grouping alone may not always generate groups that are quasi-orthogonal to each other. In this case, the base station can forcibly make groups that are not orthogonal to be orthogonal through a BD scheme, which will be described later.

2) Block Diagonalization

Figure 5:
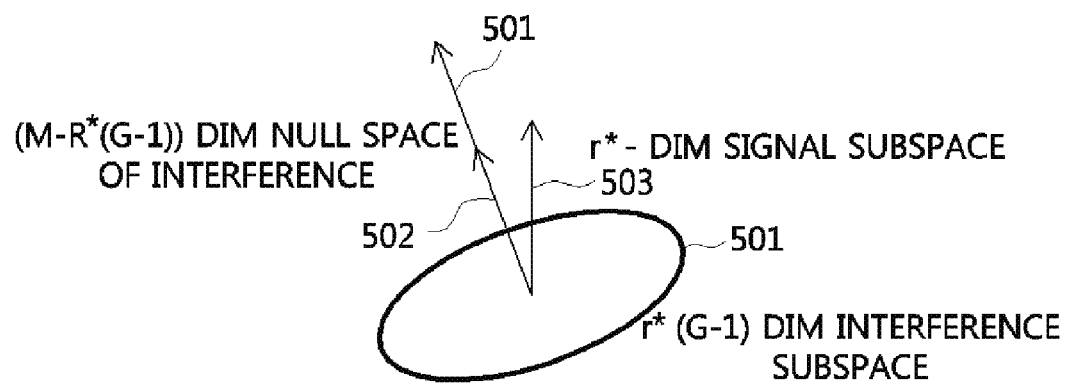
FIG. 5 is a conceptual diagram of block diagonalization (BD) in a MIMO transmission and reception method according to the present invention.

FIG. 5 is a conceptual diagram of BD in a MIMO transmission and reception method according to the present invention.

With reference to FIG. 5, BD for a specific group g will be conceptually described.

In a vector space of a total of M dimensions, eigenvectors of G-1 groups other than group g form a subspace (an ellipse 510 in the drawing) of r*(G-1) dimensions, which becomes interference of the other groups exerted on group g. Then, a null space (a line 501) orthogonal to the subspace is made, and a subspace (a line 503) formed by eigenvectors of a self-signal of r* dimensions is projected to the null space. It is possible to know that the projected self-signal subspace (a line 502) is orthogonal to the interference subspace.

In the next step, an eigenvector in the projected self-signal subspace is calculated. The eigenvector forms an optimum beamforming matrix (which corresponds to eigen-beamforming causing slight distortion, and thus can be referred to as being close to the optimum in an implicit channel feedback-based MU-MIMO beamforming scheme) in a self-subspace to which the eigenvector is projected while orthogonality with eigenvectors of the other groups is maintained.

The only condition enabling the above-described BD is roughly $$r^* \leq \frac{M}{G}.$$

Also, estimation is made in advance so that as many groups as possible become orthogonal to each other through UE grouping. For this reason, a very small part of all groups interfere with each other, and BD is performed on the corresponding groups only. Thus, it is possible to minimize loss caused by BD.

In this specification of the present invention, implicit UE feedback is mainly handled. Thus, when a number K of active pieces of UE in a system is large enough, s'=b', and $P_g$ is as Equation 11 below.

$$P_g = I, \forall g \quad \text{[Equation 11]}$$

Meanwhile, a case in which s'<b' due to a small number of active pieces of UE or determination of a scheduler is as follows. It is assumed that a set of all active users corresponding to group g is $\mathscr{K}_g = \{1, 2, \ldots, K'\}$, and an index set of a maximum of b' usable generalized beamforming (GBF) vectors is $\{1, 2, \ldots, b'\}$. A base station scheduler maps actually scheduled s' users in $\mathscr{K}_g$ to a subset $\mathscr{S}_g \in \{1, 2, \ldots, b'\}$. Thus, in this case, $P_g$ is presented as follows.

$$P_g = [e_{\mathscr{S}_g(1)}, \ldots, e_{\mathscr{S}_g(s')}] \quad \text{[Equation 12]}$$

Here, $e_n$ is a b' dimensional column vector whose $n^{th}$ element alone is 1 and whose other elements are 0, and $\mathscr{S}_g$ denotes an $i^{th}$ element of a subset $\mathscr{S}_g$.

Consequently, when BD is not used, beamforming according to the present invention corresponds to eigen-beamforming as Equation 10, and Equation 2 is presented as Equation 13 below.

$$x_g = B_g P_g d_g, \forall g \quad \text{[Equation 13]}$$

Here, $d_g$ is a data symbol vector of the user set $\mathscr{S}_g$ selected by the scheduler, and $P_g$ is presented as Equation 11 or Equation 12.

$P_g$ has been described above under the assumption of MU-MIMO. In case of SU-MIMO, $P_g$ can be a co-phasing factor such as a dual codebook of LTE, and also a more detailed precoding matrix.

D) Reference Signal (RS)

1) CSI-RS

A CSI-RS in the present invention exists for feedback of statistical channel information, and an RS for feedback of instantaneous channel information is a GRS to be described below. Thus, when a base station can obtain enough statistical channel information through an uplink SRS, no CSI-RS is necessary in the present invention.

If it is difficult to estimate statistical channel information using an SRS only, when a maximum number M of transmitting antennas is considered to be 64 and there will be no cell-specific RS (CRS) transmission of LTE in the future, resources used for CRS transmission will be able to be used for CSI-RS transmission.

Such a CSI-RS is for UE to estimate and feed back statistical channel information rather than instantaneous channel information, and may be transmitted for a much longer period than an existing CSI-RS.

2) Group-Specific RS (GRS)

GRSs proposed in the present invention are RSs specified for respective groups, and are RSs multiplied by beamforming matrices, like an existing DM-RS (or UE-specific RSs of LTE) of LTE-Advanced. Here, respective group beamforming vectors $b_{g,i}$ (an column vector of $B_g = [b_{g,1}, b_{g,2}, \ldots, b_{g,b'}]$) are multiplied to generate b' GRSs. Needless to say, in case of s'<b', only s' GRSs may be selected from among the b' GRSs and generated to reduce RS overhead. In addition, GRSs of groups that belong to one class through the above-described UE grouping and group beamforming matrix generation process slightly interfere with each other, and thus can use the same resources without interfering with each other by additionally applying a pseudo-random sequence, like a DM-RS.

A GRS performs both of CSI-RS and DM-RS functions of LTE as follows.

(1) CSI-RS Function

The CSI-RS function performed by a GRS is intended to enable pieces of UE to feed back instantaneous channel information. In the present invention, UE can estimate $h_{g_k}^H b_{g,i}$ through a GRS and perform implicit channel feedback such as a CQI, a PMI and RI on the basis of $h_{g_k}^H b_{g,i}$.

(2) DM-RS Function

The DM-RS function performed by a GRS is to implicitly transfer a beamforming (or precoding) vector selected by a base station to UE, and to become an RS for DM. A GRS can be regarded as a specific RS, which will be described later. In other words, the group beamforming matrix $B_g$ provides beamforming vectors optimized for pieces of UE in a group, and thus the base station has no reason to select a beamforming vector other than $B_g$. Thus, it is all right for UE to regard that a transmission signal has been beamformed through a PMI fed back by the UE itself, and it is not required to additionally transmit a DM-RS to know a beamforming vector selected by the base station. In addition, even when scheduling has not been performed according to a rank fed back by UE, the corresponding PMI does not change, and the UE can know its rank and PMI through a simple detection test without the help of the base station.

For example, when UE feeds back two CQIs and PMIs using rank 2, in order to know how many ranks and which PMI are actually used for transmission by a base station, the UE performs detection for each of three cases (a case in which a rank is rank 2 and thus both of PMI1 and PMI2 are used, a case in which a rank is rank 1 and PMI1 is used, and a case in which a rank is rank 1 and PMI2 is used), and then can know a correct rank and PMI by calculating a post SINR.

It is apparent that a GRS can be an RS for coherent demodulation. All groups belonging to one class can reuse the same GRS resources, and at this time, quasi-orthogonal sequences are used according to the respective groups. Also, pieces of UE scheduled for the same time in a group are identified using different orthogonal sequences. For example, when four pieces of UE are scheduled in each group, an orthogonal sequence having a sequence length of 4 is necessary.

A GRS resource location can use a resource location of an existing DM-RS. Also, unlike in related art, resources of a GRS are not necessary as many as the number of scheduled pieces of UE due to resource reuse between groups, but are required as many as a number obtained by dividing the number of pieces of UE scheduled for the same time by the number of groups. For example, when 16 pieces of UE are classified into four groups and scheduled for the same time, four GRS resources rather than 16 GRS resources are necessary (in case of assigning one layer per one piece of UE).

A case in which a GRS is used for the CSI-RS function has an advantage of higher periodicity. While an existing CSI-RS has a minimum transmission period of 5 ms, a (fixed rather than minimum) period of a GRS can be 5 ms or less. This is because a GRS is transmitted in every subframe to which resources of the corresponding class are allocated, like a DM-RS. In addition, while a DM-RS exists only when the corresponding resources are allocated to UE, a GRS exists even when another piece of UE in the same group is allocated the corresponding resources. Thus, there is another advantage in that channel estimation can be more accurately performed using a DM-RS even when UE is not allocated the corresponding resources.

Meanwhile, it is possible to separately prepare GRSs as a CSI-GRS and a DM-GRS according to the types of a CSI-RS and a DM-RS of LTE-Advanced. In this case, there is a problem that RS overhead is additionally required. Also, when a DM-GRS is separately prepared, a base station can transmit the DM-GRS using a precoding matrix other than a GBF vector fed back from UE, but the resultant benefit is determined to be very limited.

E) UE Feedback

In this specification, implicit UE feedback will be mainly described, and explicit UE feedback will be simply described at the end.

1) Eigenvector Matrix

As described above, when it is difficult to estimate a transmit correlation matrix using an uplink SRS only, UE should estimate a transmit correlation matrix through a CSI-RS. Thus, the UE estimates the transmit correlation matrix through the CSI-RS, and feeds back information on a dominant eigenvector matrix $U_{g_k}$ of the transmit correlation matrix in the following two methods.

Explicitly feed back an estimated value of the eigenvector matrix $U_{g_k}$ through vector quantization.

Extract an AS and an AoD from an estimated value of the eigenvector matrix $U_{g_k}$, and implicitly feed back the AS and the AoD. A base station receives feedback of an AS and an AoD, and can estimate $U_{g_k}$ under the assumption of the one-ring channel model. Here, using a well-verified super-resolution algorithm such as MUultiple SIgnal Classification (MUSIC) and Estimation of Signal Parameters via Rotational Invariance Technique (ESPRIT), it is possible to estimate the AS and the AoD (or angle of arrival (AoA)) from a channel matrix. In this specification, description of a detailed algorithm for extracting an AS and an AoD will be omitted.

2) Adaptive Codebook

As a codebook of implicit UE feedback for the present invention, an adaptive codebook rather than a fixed codebook of LTE can be used. In other words, since beamforming vectors constituting the codebook are specified for groups (equivalent to pieces of UE), the beamforming vectors are different according to the respective groups and classes and can very slowly change according to time (movement and activation/deactivation of UE).

The adaptive codebook of the present invention can be presented as Equation 14 below.

$$C = \{C^{(1)}, C^{(2)}, \ldots C^{(T)}\} \quad \text{[Equation 14]}$$

Here, a codebook subset $C^{(t)}$ corresponding to class t is as follows.

$$C^{(t)} = \{W_1^{(t)}, W_2^{(t)}, \ldots, W_G^{(t)}\} \quad \text{[Equation 15]}$$

$W_g^{(t)}$ of each class codebook $C^{(t)}$ consists of b'(=b/G) beamforming vectors $b_{g,i}^{(t)}$. As mentioned above, the adaptive codebook can be very slowly change according to time, and an index indicating time is omitted.

Next, an adaptive codebook will be proposed according to a Rel. 10 dual codebook appropriate for a cross-polarization antenna, and the required amount of PMI feedback resources will be calculated. When a rank of UE is 1 (or when a base station assigns only one layer to each piece of UE), an adaptive codebook of class t and group g is as follows.

$$W_g^{(t)} \in \left\{ \begin{bmatrix} b_{g,i}^{(t)} \\ \alpha b_{g,i}^{(t)} \end{bmatrix} : i = 1, \cdots, b' \text{ and } \alpha = 1, -1, j, -j \right\} \quad \text{[Equation 16]}$$

Here, α is a co-phasing factor, and intended for coherent combining of co-polarization antenna signals. Thus, in case of b'=4, PMI feedback resources of four bits are necessary. Even when a rank is 2 or higher, it is possible to design an adaptive codebook with a very limited combination, like an LTE dual codebook, to maintain the required PMI resource amount of four bits. In this case, there is surely a tradeoff between system capacity and feedback load. A codebook of rank 2 or higher should be designed through not only a logical basis but also more realistic performance analysis, such as a system-level simulation (SLS), and thus will be omitted in the present conceptual design.

Unless imperatively necessary, a superscript t denoting a class will be omitted in all equations for convenience while the equations are described in this specification.

3) Fixed Codebook

As a codebook of the present invention in another form, a fixed codebook of can be designed like in LTE. According to the above-described adaptive codebook, assuming that a base station knows transmit correlation matrices of all pieces of UE, the base station performs UE grouping, designs a codebook optimized for the pieces of UE currently in a cell, and transmits the codebook using a GRS, and the pieces of UE measure the codebook and feed back beamforming vectors best for themselves. When the base station estimates the transmit correlation matrix of the pieces of UE using SRSs only, the pieces of UE do not even need to know their transmit correlation matrices.

On the other hand, according to the fixed codebook, without assuming that a base station knows transmit correlation matrices of all pieces of UE, a predetermined limited codebook is designed, and UE first estimates its transmit correlation matrix through CSI-RSs of considerably long periods, selects a beamforming vector best for the UE itself on the basis of the codebook, and feeds back the beamforming vector.

This codebook has a characteristic that it is designed to satisfy similarity between UE and a specific group and orthogonality between groups.

For example, when ASs of UE are classified into four stages including 5 degrees, 10 degrees, 20 degrees, and more than 20 degrees, the number of groups that can be formed in one sector having a range of 120 degrees (i.e., that are quasi-orthogonal) at each AS can be 4, 3, 2, or 1. In other words, assuming that the AS is 5 degrees, four beamforming matrices corresponding to four groups are generated in one sector. A method of forming a set of such beamforming matrices (i.e., a codebook) can be designed under the assumption of, for example, the one-ring channel model.

Next, codebook design will be described. To design a good codebook, a measure should be clearly defined. For example, in this specification, a measure of orthogonality is defined as Equation 17 below.

$$\beta_{g,h}^{(t)} = \frac{1}{\sqrt{r_g^{(t)*} r_h^{(t)*}}} s(U_g^{(t)*}, U_h^{(t)*})$$ [Equation 17]

Here $s(A,B)=\|A*B\|_F^2$, and the smaller the value, the higher the orthogonality between two groups g and h. In codebook design, it is important to carefully determine an AoD set $\Theta^{(t)}$ of each group so that eigenvectors $U_g$ of groups become quasi-orthogonal to each other. According to a given AS and the number of groups, an optimum $\Theta^{(t)}$ that minimizes the value of Equation 17 can be calculated using Equation 18 below.

$$\Theta^{(t)\hat{a}} = \operatorname{argmin}_{\Theta(t)} \sum_{g=1}^{G-1} \sum_{h=g+1}^{G} \beta_{g,h}^{(t)}$$ [Equation 18]

A measure for calculating the optimum $\Theta^{(t)}$ is to minimize the sum of orthogonalities between all groups of class t.

A $\Theta^{(t)}$ design method in case of an AS being 10 degrees will be described as an example according to the aforementioned measure. In this case, to determine three group AoDs, a reference angle or an anchor angle $\theta_{ref}$ of around 0 degree that becomes a reference is determined. In this case, a range of the reference angle becomes 40 degrees (120/3) by dividing 120 degrees of one sector by a number G of groups, and the reference angle has a value of −20 degrees to 20 degrees. When only an AoD of one case of the reference angle being 0 degree to 20 degrees is calculated using a symmetry characteristic of $\Theta^{(t)}$, an AoD of the other side also is easily calculated. When the range from 0 degree to 20 degrees is divided by 16, 16 reference angles $\theta_{ref}$ are obtained. When one of the 16 reference angles is selected, the other two AoDs can be given as Equation 19 below.

$$\theta_1 = \theta_{ref} - 40° + \delta_1, \theta_2 = \theta_{ref} + 40° + \delta_2$$ [Equation 19]

Here, $\delta_1, \delta_2$, each can have a range from −5 degrees to 5 degrees and a granularity of 1 degree. Thus, upon calculation of the AoD set $\Theta^{(t)}$, the number of cases is about 1,936 (=16*11*11) or less at most. Considering an AoD of the other side in the same way, it is possible to calculate a total of 32 fixed AoD reference angles and the other two AoDs $\theta_1$, $\theta_2$ corresponding to each of the 32 fixed AoD reference angles.

Using AoD $\Theta^{(t)}$ calculated from the given AS, the number of transmitting antennas, distance between the antennas, and the equations, the eigenvector matrix $U_g$ of each group can be calculated through the one-ring channel model. In general, $U_g$ calculated in this way are not accurately orthogonal to each other. Since the core of implementation according to the present invention is orthogonality between groups, it is necessary to improve orthogonality between groups through BD. Thus, a beamforming matrix $B_g$ is calculated through BD of the matrices $U_g$ calculated in advance.

Meanwhile, long-term PMI feedback caused by the above-described fixed codebook is classified into the following two types. First, when an AS of UE is divided into four AS ranges, two bits are required. When each AS is 10 degrees, the number of cases of the beamforming matrix $B_g$ requires seven bits for the AS including 32 reference angles $\theta_{ref}$ and 2-bit information indicating a belonging group among three groups. Since the AS and $B_g$ are very slowly changing statistical characteristics, feedback of them has a very long period, or they may be fed back only when there is a change in them.

4) MU-CQI

Unlike the above-described long-term UE feedback, this channel information feedback is instantaneous feedback. CQI feedback of LTE is a SU-CQI based on SU-MIMO. In other words, a CQI having no information on interference caused by another piece of UE scheduled on the same resources is fed back. On the other hand, it is well known that a MU-CQI in which interference caused by another piece of UE is taken into consideration is necessary in MU-MIMO, and benefit of the MU-CQI can be very much. For this reason, in existing LTE, a MU-CQI is approximately estimated by, for example, calculating a predicted MU-CQI for implementation, but the estimated MU-CQI may be significantly different from an accurate MU-CQI.

A GRS structure of the present invention facilitates MU-CQI feedback of UE. As mentioned above, UE $g_k$ can estimate $h_{g_k}{}^H b_{g,m}$, m=1, . . . , b' that is an inner product of beamforming vectors of a group to which the UE belongs and a channel through a GRS. Assuming that a total of b' beamforming vectors are simultaneously transmitted, the UE measures a MU-CQI corresponding to an SINR as follows, and feeds back the MU-CQI to a base station.

$$MU-CQI_{g_k} = \max_m \frac{|h_{g_k}^H b_{g,m}|^2}{\sigma^2 + \sum_{n=1, n \neq m}^{b'} |h_{g_k}^H b_{g,n}|^2}$$ [Equation 20]

Here, $\sigma^2$ denotes background noise and interference of other cells. The base station can cause only UE that measures a higher MU-CQI than a specific reference value to perform feedback. The above equation is under the assumption of rank 1 of co-polarization, and in case of cross-polarization and rank 2 or higher, a post SINR in which a reception algorithm such as minimum mean-square error (MMSE) detection or turbo reception is taken into consideration should be calculated.

The MU-CQI is efficient because of a high probability that the base station will simultaneously transmit all of the b' beamforming vectors. This is cause $b_{g,m}$ is a beamforming vector specified for pieces of UE belonging to a group, and there are b' candidate beams, which have a very smaller number than a fixed beam method (when M=8 like in LTE Rel. 10, W1 consists of four beams, which are substantially eight beams in case of a cross-polarization antenna, and when M increases to 32, W1 consists of 32 beams. On the other hand, since the present invention has a characteristic that quasi-orthogonality between groups is maintained, b'=4 in general when M=32. Meanwhile, when the number of pieces of UE belonging to a specific group is small, the base station can select s' beamforming vectors, which is less than b' (s'<b') among b' beamforming vectors and simultaneously transmit the s' beamforming vectors or limit beamforming vectors to two or three specific combinations of $$\binom{b'}{s'}.$$

In this case, there can be the following ideas.

The base station should notify UE of which s' beams (s' beams selected from among b' beams can vary over time) are used, or which combination is used.

As mentioned in the adaptive codebook method among the UE feedback methods, a codebook is limited, like in LTE, so that only a fixed specific combination is used.

The number of bits required for feeding back a MU-CQI can be the same as a value of an existing LTE SU-CQI.

Meanwhile, a PMI to be fed back by UE corresponds to an index m that maximizes Equation 20 above.

5) Group Interference Measurement

MU-CQI calculation of Equation 20 above is under the assumption that interference of other groups is very slight. Meanwhile, when there is a significant disagreement between a beamforming vector $B_g$ (i.e., $U_g$) of a group and an eigenvector $U_g$ of UE $g_k$, the corresponding UE may encounter considerable interference from other groups. To solve such a potential problem, it is possible to use the fact that, when a specific beam becomes a strong interference signal, the corresponding $|h_{g_k}{}^H b_{g',n}|$ can be estimated because the UE can not only receive a GRS of its group but also receive GRSs of all groups. At this time, the UE needs to remove beams $|h_{g_k}{}^H b_{g,m}|$, m=1, . . . , b' of its group from the received signals and estimate $|h_{g_k}{}^H b_{g',n}|$. To this end, a base station should transmit a control signal for receiving GRSs of all groups to all pieces of UE belonging to a specific class, or make a GRS sequence determination formula in which a group identifier (ID) as well as a cell ID are included.

When the UE measures and considers interference of other groups in MU-CQI calculation as described above, Equation 20 is replaced by Equation 21 below.

$$MU-CQI_{g_k} = \max_m \frac{|h_{g_k}^H b_{g,m}|^2}{\sigma^2 + \sum_{n \neq m} |h_{g_k}^H b_{g,n}|^2 + \sum_{g' \neq g} \sum_{n=1}^{b'} |h_{g_k}^H b_{g',n}|^2}$$ [Equation 21]

Here, in $\Sigma_{g' \neq g} \Sigma_{n=1}^{b'} |h_{g_k}{}^H b_{g',n}|^2$, only group interference exceeding a specific reference value is actually taken into consideration. Such a MU-CQI can be regarded as a safety factor for when unexpected considerable group interference is in a MU-MIMO system according to the present invention.

6) RI

As described above, the present invention uses adaptive beams optimized for MU-MIMO in a scenario in which there are a large number of transmitting antennas and active pieces of UE, and thus a probability that a base station will schedule all MIMO resources for MU-MIMO becomes very high. In such MU-MIMO, the base station generally limits a rank of UE to 1 or 2 to increase system capacity. On the other hand, when there are a small number of pieces of UE, the base station may cause the pieces of UE to perform feedback using SU-CQIs to increase system capacity.

When a rank set by the base station is 2, UE feeds back CSI corresponding to two code words, and thus the base station can see feedback of pieces of UE belonging to each group and determine whether to perform transmission to scheduled UE using actual rank 1 or 2.

7) Explicit UE Feedback

Explicit UE feedback is a method of feeding back direct information on a channel matrix instead of a PMI. Each piece of UE quantizes and feeds back its modified channel vector $h_{g_k}{}^H B_g$ to a base station. An example of a method of quantizing a channel vector is a quantization method using channel direction information (CDI).

The base station calculates a precoding matrix $P_g$ according to an algorithm (e.g., zero-forcing (ZF) beamforming) using explicit channel feedback of UE and CQI information obtained by measuring interference of other cells, and performs MU-MIMO using the precoding matrix $P_g$. In this case, a difference with the implicit UE feedback method is that a DM-RS is additionally necessary besides a GRS serving as a CSI-RS.

F) Downlink Control Signal

In addition to an existing downlink control signal of LTE-Advanced, a new control signal as described below is necessary. The control signal is about CSI measurement resources (i.e., a scheduling resource candidate).

A large-scale transmitting antenna system simultaneously accommodates far more active pieces of UE than an existing system. An LTE system has a basic mode in which UE is caused to measure and report CSI on an entire frequency band. However, when the number of active pieces of UE becomes very large, it may be difficult for the system to take such CSI feedback overhead. To solve this problem, the present invention can apply a method of allocating CSI measurement resources according to classes.

In an LTE-Advanced downlink MIMO transmission method, a base station sends CSI measurement resources of UE using a radio resource control (RRC) message, and the information is not changed while the UE is in an active state. On the other hand, in the present invention, pieces of UE are classified (pre-scheduled) according to classes, and the corresponding class of UE can be changed according to movement of the UE or load balancing between classes.

In addition, since a base station allocates different resources according to classes, CSI measurement and scheduling resources can be changed when a class of UE is changed while the UE is in the active state. Unlike in LTE-Advanced, CSI measurement resources can be changed in the active state, and thus a CSI measurement resource control signal according to the present invention accords with characteristics of a media access control (MAC) message rather than an RRC message.

Figure 6:
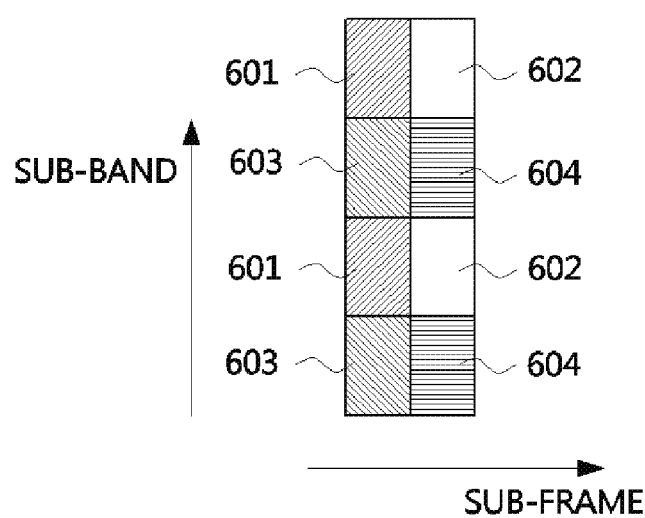
FIG. 6 is a conceptual diagram of an example of allocation of channel state information (CSI) measurement resource or scheduling resource candidates according to the present invention.

FIG. 6 is a conceptual diagram of an example of allocation of CSI measurement resource or scheduling resource candidates according to the present invention.

FIG. 6 is a case in which the number of classes is four. This shows an example of a case in which separate resources are allocated according to classes. For example, resources 601 filled with lower left-to-upper right diagonal lines may be allocated to class 1, and resources 603 filled with upper left-to-lower right diagonal lines may be allocated to class 3.

The number of classes and an allocated resource size can vary semi-statically (about several minutes to tens of minutes) according to distribution of UE.

According to the present invention, a CSI measurement resource control signal can be signaled in the following two methods.

1) Case of Using Class ID (RNTI)

A base station transfers all class-specific CSI measurement resource or scheduling resource maps/modes to respective pieces of UE through MAC messages, and notifies the respective pieces of UE of their class radio network temporary identifiers (RNTIs). When a class of UE is changed along with movement of the UE, etc., the base station only signals the changed class RNTI using a MAC message, and the UE can know resources of the corresponding class. Also, using the class RNTI, it is possible to perform multicast according to classes and groups.

2) Case of Using No Class ID (RNTI)

A base station notifies pieces of UE of CSI measurement resources of classes corresponding to the respective pieces of UE using MAC messages, and notifies UE of CSI measurement resources of a class changed along with movement of the UE, or so on.

In case 1) above, UE requires a group ID (RNTI) to know its GRS sequence. The base station makes a GRS sequence determination formula including a cell ID and a group ID, and thereby can cause the UE to know the GRS sequence using only a cell ID and a group ID. Since different resources are used for respective classes, it is unnecessary to divide the GRS sequence according to class IDs. Also, in the present invention, an adaptive codebook whereby a GRS is specified for UE is used, and thus a PMI is mapped to a GRS sequence in a one-to-one fashion. As described above regarding a GRS, UE can implicitly know its beamforming matrix in the present invention. Thus, a GRS sequence needs not to be dynamically assigned through a physical downlink control channel (PDCCH), unlike an existing DM-RS sequence.

Meanwhile, in the present invention, it may be unnecessary for a base station to explicitly notify UE of RI through a PDCCH like a PMI. The base station determines the number of layers to be actually transmitted to the UE with reference to RI fed back by the UE, and transmits the layers. The UE calculates a post-SINR through a process such as a simple detection test for a PMI, and thereby can know the number of layers actually transmitted by the base station.

G) Scheduling

In the present invention, a group can be regarded as a virtual sector based on group classification. In other words, a base station may perform scheduling separately according to respective classes and groups. As described above regarding a MU-CQI, the base station receives feedback of MU-CQIs from all active pieces of UE belonging to a specific group. Scheduling performed by the base station is a process of finding a combination of pieces of UE that maximizes a utility function in which the MU-CQIs are multiplied by weights denoting the fairness of the respective pieces of UE. For example, even when some pieces of UE feed back the same beamforming vector (PMI) or a plurality of beamforming vectors, weights are multiplied according to the respective pieces of UE (when specific UE has a large amount of accumulated received data, the corresponding weight generally decreases in proportion to the large amount for the sake of fairness), and a combination of pieces of UE that maximizes the utility function may be found.

H) 3D Beamforming

Thus far, in this specification, beamforming in which a large-scale transmitting antennas are arranged along a horizontal axis has been taken into consideration. In addition to this, a large-scale transmitting antenna system in which an antenna arrangement is extended along a vertical axis can also be taken into consideration, and a beamforming technique using both of horizontal-axis and vertical-axis spaces is referred to as three-dimensional (3D) beamforming.

Figure 7:
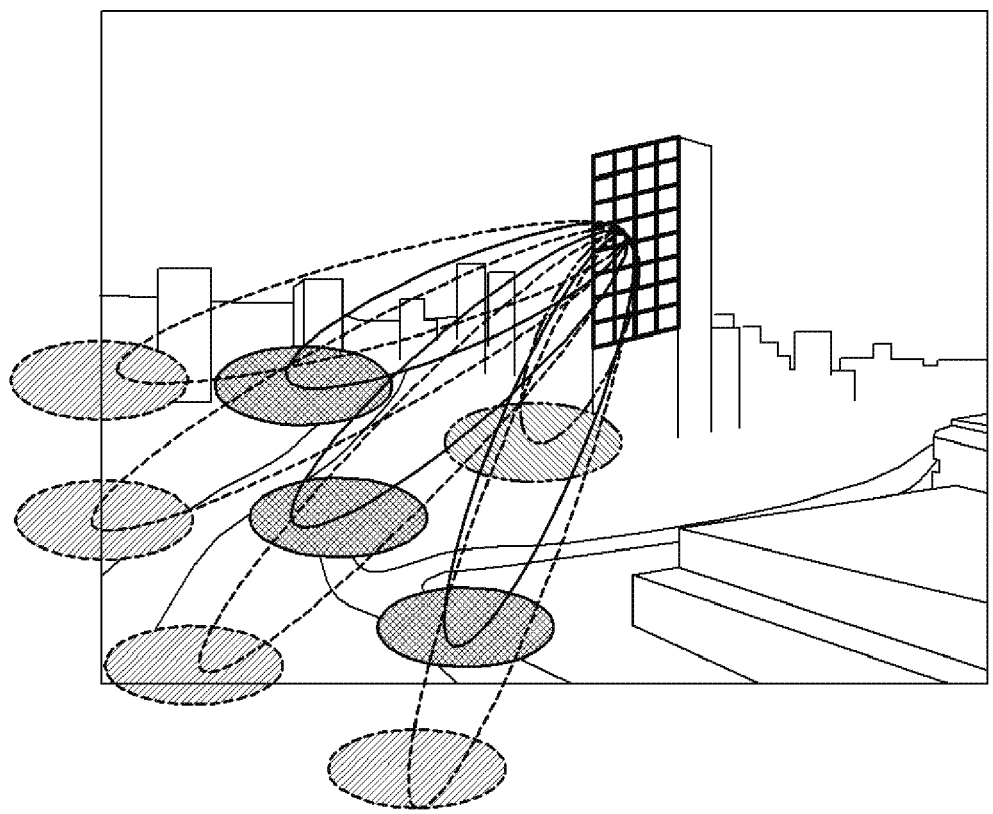
FIG. 7 is a conceptual diagram of a three-dimensional (3D) beamforming technique.

FIG. 7 is a conceptual diagram of a 3D beamforming technique, in which a macro base station located in an urban skyscraper performs beamforming using both of horizontal-axis and vertical-axis spaces.

This section introduces a 3D beamforming technique by which the concept of MIMO transmission of the present invention in which the foregoing horizontal-axis beamforming is taken into consideration is extended to the vertical axis as well.

First, a CSI-RS structure and a PMI feedback scheme for 3D beamforming will be described in brief.

In case of a long-term CSI-RS structure, even when a base station has a plurality of arrays along each of the horizontal axis and the vertical axis, there can be one eigenvector matrix, which is a statistical channel characteristic of UE, along each of the horizontal axis and the vertical axis because the arrays are two-dimensional (2D) antenna arrays. Thus, a long-term CSI-RS needs not to be in every 2D antenna element, and it is all right to transmit the long-term CSI-RS using one row as the horizontal axis and one column as the vertical axis.

In case of a short-term CSI-RS structure, an eigenvector matrix of UE has a structure as described above, but a short-term fading channel may have a plurality of different arrays along each of the horizontal axis and the vertical axis. Thus, a short-term CSI-RS needs to be transmitted for every 2D antenna element.

In case of long-term PMI feedback, a long-term PMI consists of one long-term PMI (a horizontal-axis class and a group ID) as the horizontal axis and one long-term PMI (a vertical-axis class and a group ID) as the vertical axis according to a long-term CSI-RS.

In case of short-term PMI feedback, since short-term PMIs may vary according to all 2D antenna elements, a plurality of short-term PMIs are fed back along the horizontal axis and a plurality of short-term PMIs are fed back along the vertical axis.

1) Channel Model

A column (horizontal axis) size of a 2D antenna array is M, a row (vertical axis) size is N, and the drawing shows an example of 3D beamforming for one class.

In this specification, only one class is taken into consideration for convenience, and it is assumed that active pieces of UE can be spatially classified into L vertical groups along the vertical axis, and G horizontal groups along the horizontal axis. Transmit correlation matrices of the vertical axis and the horizontal axis are $R_{V,l}$ and $R_{H,g}$, respectively. These vertical and horizontal transmit correlation matrices are presented through eigendecomposition as follows.

$$R_{V,l} = U_{V,l} \Lambda_{V,l} U_{V,l}^*, R_{H,g} = U_{H,g} \Lambda_{H,g} U_{H,g}^* \quad \text{[Equation 22]}$$

In this case, when a Kronecker (more accurately, one-ring) channel model is extended to a 3D channel model, the 3D correlation matrix $R_{l,g}$ is presented as a Kronecker product as follows.

$$R_{l,g} = R_{H,g} \otimes R_{V,l} = (U_{H,g} \otimes U_{V,l})(\Lambda_{H,g} \otimes \Lambda_{V,l})(U_{H,g}^* \otimes U_{V,l}^*) \quad \text{[Equation 23]}$$

Using the 3D transmit correlation matrices, a channel vector of UE belonging to vertical/horizontal groups g and l is presented as Equation 24 below.

$$h_{l,g_k}^* = w_{l,g_k}^* (\Lambda_{H,g}^{1/2} \otimes \Lambda_{V,l}^{1/2})(U_{H,g}^* \otimes U_{V,l}^*) \quad \text{[Equation 24]}$$

2) Beamforming Matrix

A 3D transmit vector is presented as Equation 25 below.

$$x = Bpd = (B_H \otimes B_V)(P_H \otimes P_V)d \quad \text{[Equation 25]}$$

Here, $B_H$, $B_V$, $P_H$, and $P_v$ are $M \times b_H$, $N \times b_v$, $b_H \times s_H$, $b_v \times s_v$ dimension matrices respectively, and d is an $S_H S_V$ dimension data symbol. As shown in channel model Equation 24 and Equation 25 above, beamfoming/precoding of the horizontal axis can be performed independently from beamfoming/ precoding of the vertical axis.

$$(U_{H,g}^* \otimes U_{V,l}^*)(B_H \otimes B_V) = (U_{H,g}^* B_H) \otimes (U_{V,l}^* B_V) \quad \text{[Equation 26]}$$

Using the relationship of Equation 26 above, a reception vector of vertical/horizontal groups l and g is presented as Equation 27 below.

$$\begin{aligned}
y_{l,g} &= W_{l,g}^* (\Lambda_{H,g}^{1/2} \otimes \Lambda_{V,l}^{1/2})(U_{H,g}^* \otimes U_{V,l}^*)(B_H \otimes B_V)Pd + z_{l,g} \quad \text{[Equation 27]} \\
&= W_{l,g}^* (\Lambda_{H,g}^{1/2} \otimes \Lambda_{V,l}^{1/2})((U_{H,g}^* B_H) \otimes (U_{V,l}^* B_V)Pd) + z_{l,g} \\
&\approx W_{l,g}^* (\Lambda_{H,g}^{1/2} \otimes \Lambda_{V,l}^{1/2})((U_{H,g}^* B_{H,g}) \otimes \\
&\quad (U_{V,l}^* B_{V,l}) P_{l,g} d_{l,g}) + z_{l,g}
\end{aligned}$$

Here, $B_H = \text{diag}(B_{H,1}, \ldots, B_{H,G})$ and $B_V = \text{diag}(B_{V,1}, \ldots, B_{V,L})$. channel, when interference between different vertical/ horizontal groups l and g becomes insignificant due to UE grouping, the following equation is satisfied, and an approximately equal sign in the above equation is valid.

$$U_{H,l,g} B_{H,l',g'} \approx 0, U_{V,l}^* B_{V,l'} \approx 0, \text{for } l' \neq l, g' \neq g \quad \text{[Equation 28]}$$

According to the above equation, an optimum 3D beamforming matrix is as follows, like a 2D beamforming matrix according to the present invention.

$$B_{H,g} = U_{H,g}, B_{V,l} = U_{V,l} \quad \text{[Equation 29]}$$

3) Codebook

Groups for 3D beamforming correspond to vertical/horizontal-axis groups obtained by subdividing a (horizontal axis) group for 2D beamforming, and a codebook of class t can be presented to include the vertical axis as follows.

$$C^{(t)}\{W_{1,1}^{(t)}, \ldots, W_{1,L}^{(t)}, \ldots, W_{G,1}^{(t)}, \ldots, W_{G,L}^{(t)}\} \quad \text{[Equation 30]}$$

As shown in Equation 25, a 3D beamforming matrix is presented as follows.

$$B_H \otimes B_V = \begin{bmatrix} B_{H,1} & \cdots & 0 \\ \vdots & \ddots & \vdots \\ 0 & \cdots & B_{H,G} \end{bmatrix} \otimes \begin{bmatrix} B_{V,1} & \cdots & 0 \\ \vdots & \ddots & \vdots \\ 0 & \cdots & B_{V,L} \end{bmatrix} \quad \text{[Equation 31]}$$

$$= \begin{bmatrix} B_{H,1} \otimes B_{V,1} & \cdots & 0 \\ \vdots & \ddots & \vdots \\ 0 & \cdots & B_{H,G} \otimes B_{V,L} \end{bmatrix}$$

Here, $B_{H,g}$, $B_{V,l}$ are given by Equation 29. Thus, in case of rank 1 transmission to a cross-polarization antenna, $W_{g,l}^{(t)}$ in Equation 30 is as follows, like in Equation 16.

$$W_{g,l}^{(t)} \in \quad \text{[Equation 32]}$$

$$\left\{ \begin{bmatrix} b_{H,g,i}^{(t)} \otimes b_{V,g,h}^{(t)} \\ \alpha b_{g,i}^{(t)} \otimes b_{V,g,h}^{(t)} \end{bmatrix} : i = 1, \cdots, b_H', h = 1, \cdots, b_V' \text{ and } \alpha = 1, -1, j, -j \right\}$$

For example, when $b'_H = b_H/G = 4$, $b'_V = b_V/L = 2$, the PMI is presented using five bits. As described in 2D beamforming, in case of rank 2 or higher, a limited combination selected from among all possible combinations should be determined.

Lastly, UE grouping, GRS, UE feedback, etc. are naturally extended to the same concepts as in 2D beamforming, and will not be specified in this specification.

FDD-Based Uplink MIMO Transmission and Reception Method According to Present Invention Extension of the above-described concept of FDD-based downlink MIMO transmission to uplink MU-MIMO transmission will be described below.

A) Uplink MIMO Reception Signal

It is assumed below that all pieces of UE have N multiple antennas, and each transmit Ns data streams for convenience. In this case, in uplink MU-MIMO, a received signal of a base station is as follows.

$$v = \sum_{i=1}^{s} H_i P_i u_i + z \quad \text{[Equation 33]}$$

Here, $P_i$ is an N×Ns dimensional precoding matrix, and $u_i$ is an Ns dimensional data symbol vector of an $i^{th}$ piece of UE. In this uplink system, s denotes the number of pieces of UE scheduled by the base station.

B) Characteristics of Uplink MIMO

The FDD-based downlink large-scale antenna MU-MIMO system described above has the problem of RS and CSI feedback, and the present invention is mainly intended to solve the problem. Meanwhile, unlike the downlink large-scale antenna MU-MIMO system, an uplink large-scale antenna MU-MIMO system has the following problems.

1) Complexity of System Calculation

As mentioned above, a large-scale antenna system can solve the problem of overload on a system crowded by a large number of users at peak time. This means a case in which data transmission and reception activities of users are very active compared to an existing system and user population in a cell. For this reason, a major problem of an uplink large-scale antenna MU-MIMO system is calculation complexity.

In uplink MU-MIMO, a base station can obtain a much better estimated CSI value than downlink MU-MIMO through an SRS of UE, and a receiving end can perform MU-MIMO through the estimated CSI value.

$$h_i^H h_j \approx 0, i \neq j \quad \text{[Equation 34]}$$

When orthogonality between instantaneous channels of two or more pieces of UE is ensured in existing uplink MU-MIMO, that is, when Equation 34 above is satisfied, the pieces of UE are scheduled through MU-MIMO.

In this case, to calculate orthogonality between instantaneous channels of all active pieces of UE, the base station should calculate an inner product of an M-dimensional vector $$\binom{K}{2}$$

times. Thus, when M and K are large as in a large-scale antenna system, calculation complexity becomes excessively high. Also, it is difficult to use a detection algorithm such as MMSE detection other than maximal ratio combining (MRC) so as to obtain better performance.

Thus, the FDD-based uplink MIMO transmission and reception technology according to the present invention is intended to perform uplink MU-MIMO while maintaining calculation complexity of a system to a practicable level. 2) Preservation of Orthogonality of Uplink/downlink Channel Correlation Matrices In extension of the concept of the downlink MIMO transmission and reception method according to the present invention to the uplink MU-MIMO transmission and reception method, it will be very useful that pieces of UE classified into one group in a downlink are also classified into one group in an uplink to perform MU-MIMO, or vice versa. This is because it is possible to reduce calculation complexity of a base station for UE grouping to the half. As a result, orthogonality between transmit correlation matrices in a downlink can be preserved as orthogonality between receive correlation matrices in an uplink, which can be described through reference literatures including "3GPP RAN1 contribution, R1-092024, Ericsson, 2009" and so on.

C) Precoding Matrix

A large-scale transmitting antenna MIMO system denotes that an antenna of a base station may be very larger than that of an existing system. Thus, the downlink MU-MIMO transmission method needs various changes as described in the previous chapter. On the other hand, a row dimension of an uplink precoding matrix is limited by a number N of antennas of UE, and N is generally limited to two to four according to a limitation on the physical size of the UE. Also, since in uplink MU-MIMO, a base station determines a precoding matrix through autonomous calculation and signals the precoding matrix to UE, the uplink MU-MIMO is the same as an uplink MU-MIMO method of an existing LTE system, and the same precoding matrix may be used.

The uplink MIMO transmission and reception method causes the base station to have a reception signal vector $\mu^g$ of a group as shown below through uplink group classification like downlink group classification, or inter-group orthogonality preservation of the previous paragraph.

$$B_g^{UL} v = v_g \approx \sum_{i=1}^{s'} \tilde{H}_{g_i} P_{g_i} u_{g_i} + z \quad \text{[Equation 35]}$$

Here, s' denotes the number of scheduled pieces of UE among pieces of UE in group g, and $\tilde{H}_{g_i} = B_g^{UL} H_{g_i}$ is a modified b'×N dimensional channel matrix. In case of a large-scale antenna system, b'<<M, and the calculation complexity of a system can be reduced.

Meanwhile, an uplink scheduler of the base station calculates an SINR of Equation 20 above to select a precoding matrix.

TDD-Based MIMO Transmission and Reception Method According to Present Invention

A) TDD Downlink MIMO Transmission and Reception Method

A basic MIMO operation procedure of a time-division duplex (TDD) system is as follows.

(1) A base station obtains downlink channel matrix information using an uplink SRS.

(2) UE calculates and reports a CQI through a CRS or a CSI-RS.

(3) The base station determines a precoding matrix, transmits a DM-RS, and signals scheduling information.

The TDD-based downlink MIMO transmission and reception technique and the FDD-based downlink MIMO transmission and reception technique are basically the same, except whether a base station can obtain channel information using uplink/downlink channel reciprocity.

In this specification, only a portion of the TDD-based downlink MIMO transmission and reception method different from the FDD-based downlink MIMO transmission and reception method will be described on the basis of a LTE TDD scheme.

1) DM-RS

The FDD-based downlink MIMO transmission and reception method according to the present invention is a MU-MIMO method based on implicit channel information feedback, and a codebook according to the FDD-based downlink MIMO transmission and reception method is based on a GRS.

On the other hand, since a base station can know a relatively accurate channel matrix in TDD, no codebook is necessary, and the base station determines a beamforming matrix $B_g$ and a precoding matrix $P_g$. Thus, an existing DM-RS is necessary, unlike in an FDD scheme. A major difference from a DM-RS of LTE is that in the present invention, G groups share DM-RS resources through UE grouping and beamforming to maintain realistic DM-RS overhead.

2) CQI Feedback

In the TDD scheme, a CQI serves to measure interference of other cells and background noise and cause UE to report the interference and background noise to a base station. Thus, the CQI has different characteristics from a CQI for determining an actual modulation and coding scheme (MCS) on the basis of a codebook as in the above-described FDD scheme.

3) Precoding Matrix

In the TDD-based downlink MIMO transmission and reception method, a base station performs UE grouping using a transmit correlation matrix of a channel matrix to generate beamforming matrices $B_g$ according to groups, and generates modified channel vectors $h_{g_k}^H B_g$ according to pieces of UE of each group. Using the channel vectors, it is possible to perform precoding for pieces of UE belonging to each group according to an algorithm.

For example, ZF beamforming can be used, and for pieces of multi-antenna UE, a BD or block triangularization (BT) algorithm can be used.

B) TDD Uplink MIMO Transmission and Reception Method

There is no difference between a TDD-based uplink MIMO transmission and reception method and the FDD-based uplink MIMO transmission and reception method. Thus, it will be all right to refer to the FDD-based uplink MIMO transmission and reception method described above.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An operation method of a user equipment (UE) in a wireless communication system, the operation method comprising:
   receiving, from a base station, information on a number of antennas and a subset of beams which is selected among all possible beams of the base station;
   generating a codebook based on the number of antennas included in the information;
   receiving a reference signal (RS) from the base station;
   determining channel state information (CSI) based on the RS and the subset of beams by using the codebook; and
   reporting the CSI to the base station,
   wherein the codebook is generated by using Kronecker product of a first beamforming vector and a second beamforming vector which are associated with different directions.

2. The operation method of claim 1,
   wherein the codebook is generated based on following equation:

$$W_{g,l}^{(t)} \in \left\{ \begin{bmatrix} b_{H,g,i}^{(t)} \otimes b_{V,g,h}^{(t)} \\ \alpha b_{g,i}^{(t)} \otimes b_{V,g,h}^{(t)} \end{bmatrix} : i = 1, \cdots, b'_H, h = 1, \cdots, b'_V \text{ and } \alpha = 1, -1, j, -j \right\},$$

wherein:
$b_{H,g,j}^{(t)}$ is the first beamforming vector,
$b_{V,g,h}^{(t)}$ is the second beamforming vector,
$\alpha$ is a co-phasing factor,
i is an index of the first beamforming vector,
h is an index of the second beamforming vector,
$b'_H$ is the number of first beamforming vectors,
$b'_V$ is the number of second beamforming vectors, and
wherein each of the $b'_H$ and the $b'_V$ is determined based on the information on the number of antennas and the subset of beams.

3. The operation method of claim 1, wherein the CSI includes at least one of a precoding matrix indicator (PMI), a channel quality indicator (CQI), and a rank indicator (RI).

* * * * *

UNITED STATES PATENT AND TRADEMARK OFFICE
CERTIFICATE OF CORRECTION

Page 1 of 1

PATENT NO. : 10,951,279 B2
APPLICATION NO. : 16/509116
DATED : March 16, 2021
INVENTOR(S) : Jun Young Nam and Jae Young Ahn It is certified that error appears in the above-identified patent and that said Letters Patent is hereby corrected as shown below:

On the Title Page

Item (73) Assignee:
Replace "Electronics and Telecommunications Research institute, Daejeon (KR)" with --Electronics and Telecommunications Research Institute, Daejeon (KR)--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*